US012476104B2

(12) United States Patent
Brandl et al.

(10) Patent No.: US 12,476,104 B2
(45) Date of Patent: Nov. 18, 2025

(54) SEGMENTED MOVEMENT CONTROL ELECTRODES IN ION TRAPS

(71) Applicant: Infineon Technologies Austria AG, Villach (AT)

(72) Inventors: Matthias Brandl, Kirchseeon (DE); Nina Agnieszka Megier, Villach (AT)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 335 days.

(21) Appl. No.: 18/325,504

(22) Filed: May 30, 2023

(65) Prior Publication Data

US 2024/0404819 A1 Dec. 5, 2024

(51) Int. Cl.
*H01J 49/42* (2006.01)
*H01J 49/02* (2006.01)

(52) U.S. Cl.
CPC ........ *H01J 49/4265* (2013.01); *H01J 49/022* (2013.01); *H01J 49/4235* (2013.01)

(58) Field of Classification Search
CPC ... H01J 49/4265; H01J 49/022; H01J 49/4235
See application file for complete search history.

(56) References Cited

U.S. PATENT DOCUMENTS

| | | | | |
|---|---|---|---|---|
| 7,157,990 B1 * | 1/2007 | Adam | .................... | H03H 9/505 977/932 |
| 11,466,987 B2 * | 10/2022 | Kozuma | ................ | G01C 19/58 |
| 2022/0246419 A1 * | 8/2022 | Leibrandt | ............. | H01J 49/424 |

FOREIGN PATENT DOCUMENTS

AU 2020277183 A1 7/2021

OTHER PUBLICATIONS

Reichle, R. et al., "Transport Dynamics of Single Ions in Segmented Microstructured Paul Trap Arrays," Fortschr. Phys. 54, No. 8-10, Wiley InterScience, Aug. 2006, 20 pages.

* cited by examiner

*Primary Examiner* — Nicole M Ippolito
(74) *Attorney, Agent, or Firm* — SLATER MATSIL, LLP

(57) ABSTRACT

A system is provided that includes: at least one radio frequency (RF) electrode extending along a first direction, the at least one RF electrode configured to generate an RF field, where a first RF electrode of the least one RF electrode is disposed in a substrate, and a plurality of direct current (DC) electrodes that are spaced apart along at least the first direction, the plurality of DC electrodes configured to generate an electric field, where the RF field and the electric field are configured to trap an ion at a first position, the first position being spaced apart from the substrate by a first distance, where each DC electrode of the plurality of DC electrodes has a respective width in the first direction that is less or equal to 0.2 times the first distance.

21 Claims, 13 Drawing Sheets

SEGMENTED MOVEMENT CONTROL ELECTRODES IN ION TRAPS

TECHNICAL FIELD

The present invention relates generally to a system and method for storing and moving ions in an ion trap, and, in particular embodiments, to a system and method for incrementally moving ions by providing voltages on individual electrodes in an ion trap.

BACKGROUND

Generally, ion traps may be used for trapped ion quantum computing, with ions used as qubits for computation, the excitation state of an electron indicating a logical value or logic state. Ions such as barium (Ba), magnesium (Mg), calcium (Ca), beryllium (Be), or the like, may be positively charged, and a single electron in the outer shall of the ion used as the logic element. Two or more ions may be entangled, as changing the state of one qubit causes the entangled qubits to change their state immediately, providing substantial speed and power savings over conventional computing, in some examples. Additionally, ion traps may be used in atomic clocks, where the internal state of the ion is used as a frequency reference, for example, for the definition of a second.

Generally, ions in an ion trap may be trapped or controlled using a radio frequency (RF) field operating at around 200 volts, and 20 megahertz (MHz). However, ion traps require a well-controlled environment, and precise handling of the ions. Therefore, maintaining a well-controlled environment by reducing the number of components that may impact the environment and improving the precision of ion handling in an ion trap is desired.

SUMMARY

In accordance with some embodiments, a system includes at least one radio frequency (RF) electrode extending along a first direction, the at least one RF electrode configured to generate an RF field, where a first RF electrode of the least one RF electrode is disposed in a substrate, and a plurality of direct current (DC) electrodes that are spaced apart along at least the first direction, the plurality of DC electrodes configured to generate an electric field, where the RF field and the electric field are configured to trap an ion at a first position, the first position being spaced apart from the substrate by a first distance, where each DC electrode of the plurality of DC electrodes has a respective width in the first direction that is less or equal to 0.2 times the first distance.

In accordance with some embodiments, a system includes at least one radio frequency (RF) electrode extending along a first direction, the at least one RF electrode configured to generate an RF field, where a first RF electrode of the at least one RF electrode is disposed in a substrate, and a plurality of direct current (DC) electrodes that are spaced apart along at least the first direction, where at least three DC electrodes from the plurality of DC electrodes are spaced apart along a second direction that is different from the first direction, where each DC electrode of the at least three DC electrodes is directly adjacent to at least another one of the at least three DC electrodes along the second direction, the at least three DC electrodes configured to generate an electric field, where the RF field and the electric field are configured to trap an ion at a first position, the first position being spaced apart from the substrate by a first distance in a third direction, the third direction being different from the first direction and the second direction.

In accordance with some embodiments, a system includes at least one radio frequency (RF) electrode extending along a first direction, the at least one RF electrode configured to generate an RF field, where a first RF electrode of the at least one RF electrode is disposed in a substrate, and a plurality of direct current (DC) electrodes that are spaced apart along at least the first direction, where at least twenty DC electrodes of the plurality of DC electrodes are configured to generate an electric field, where the RF field generated by the at least one RF electrode and the electric field generated by the at least twenty DC electrodes are configured to trap a single ion or a single chain of ions at a first position, the first position being spaced apart from the substrate by a first distance.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
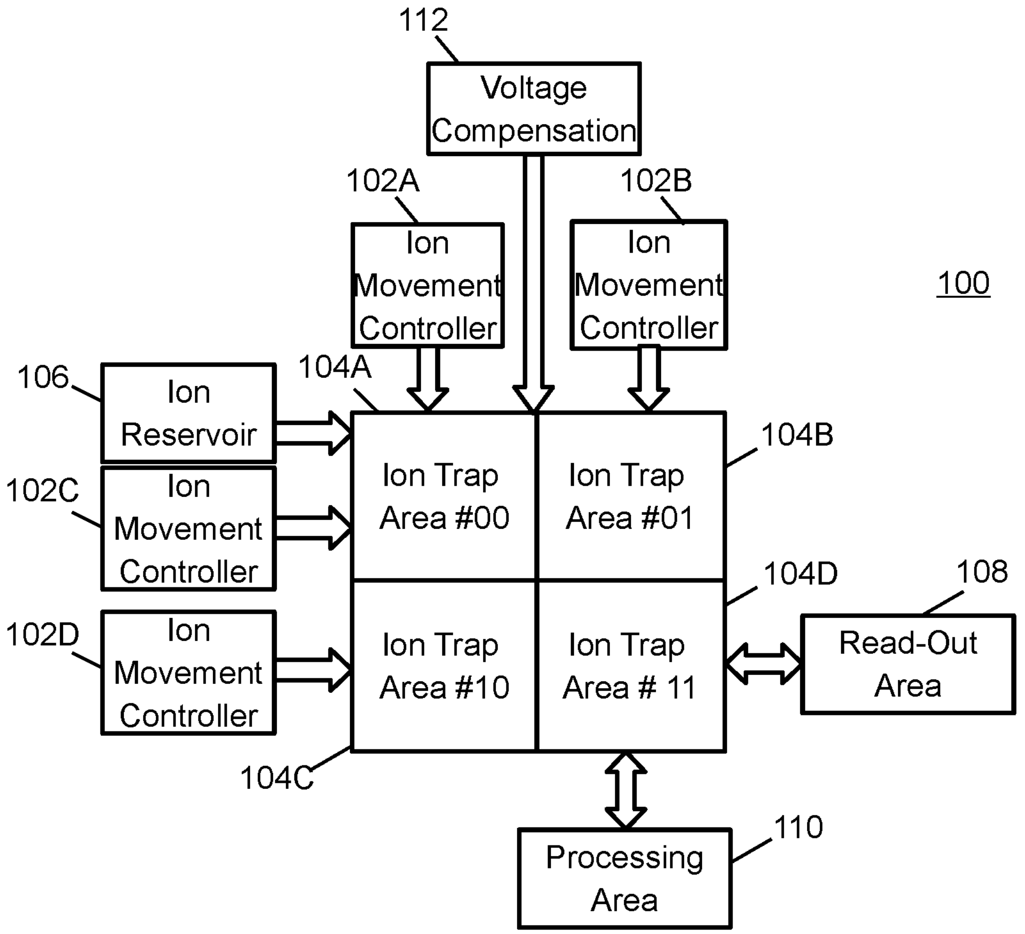
FIG. 1 is a logical diagram illustrating an ion trap system with an ion movement system according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Ion trapping is a promising candidate for quantum computing, atomic clocks, and other technologies dependent on isolating single ions or chain of ions. In Penning traps, the ions are confined via a magnetic field and an electrostatic potential. In Paul traps, the ions are confined via an RF-voltage and an electrostatic potential. In a trapped ion quantum computing system, electrostatic potentials are used to move ions between storage and processing locations in a process called ion shuttling. Similarly, electrostatic potentials are used in atomic clocks to trap and control an ion, with properties of the ion used to define the length of a second. In order to control these potentials, hundreds, or even thousands, of electrodes may be simultaneously controlled in order to provide the desired electrical field (E-field). Individualized control of the electrodes requires use of digital-to-analog converters (DACs). However, these systems may experience stray fields, which may vary overtime and depend on the position. Typically, as a result of the stray fields, the RF-trapping point of an RF field, called RF-null, does not perfectly align with the electrostatic or direct current (DC) trapping point. In order to address the stray fields, and to provide control of in movement, DACs may be used to provide voltages to electrodes in the system, but the number of DACs should be minimized to efficiently use system space. Further, utilizing a greater number of smaller electrodes to form electrode segments that provide individual voltage profiles, that produce the desired E-field in the ion trap, may allow for finer control of the produced E-field. The voltage profiles associated with the electrode groups may have low voltage profiles and high voltage profiles, wherein the high voltage profile is relative to the low voltage profile. In some embodiments, the low voltage profiles associated with individual electrode segments may provide a DC confinement field configured to hold an ion at the electrostatic or the DC trapping point within a region defined by the low voltage profile. Additionally, by selectively changing the voltage on individual electrodes within the electrode segments a compensation field can additionally be provided in order to overlap the RF and the electrostatic or DC trapping points. In addition to the electrode segments utilized to control movement of the ion in the ion trap, compensation electrode pairs may be provided along with the electrode segments to provide compensation to help compensate for stray fields. In some embodiments, the compensation electrode pairs are connected to a variable voltage source such as a DAC.

A system for ion movement within the ion trap may use a limited number of DACs that are each connected to a large number of electrode segments in a multidimensional array via a switching complex system. The multidimensional array for the ion movement system provides for shuttling of multiple ions in multiple different directions simultaneously using the same DACs. Thus, the cost and power requirements associated with a one-to-one DAC-to-electrode arrangement is reduced by using the same DACs to control multiple electrodes within the multidimensional array.

The potential for stray fields from electrical components within the ion movement system may misalign the RF-null point and the electrostatic or the DC trapping point, and may slowly vary over time resulting in voltage fields inconsistent with the desired voltage fields associated with the ion movement electrodes being inconsistent with respect to the desired voltage fields. However, by moving the ion within the ion movement system by systematically shifting the position of the confinement field holding the ion as opposed to applying multiple voltages to shuttling electrodes within the confinement field to move the ion within the ion confinement field the number of electrical components (e.g., DACs) may be significantly reduced, thereby reducing stray fields. Further, compensation fields may be more precisely controlled for aligning the RF trapping point and the DC trapping point through the use of variable voltage compensation electrodes and through selectively switching the voltage set on the individual movement electrode, and the number of electrode segments in a group to finely adjust the E-field produced by groups of electrodes. Additionally, by incrementally shifting the confinement field associated with the voltage profiles formed by groups of the electrodes through controlled switching of the voltages set on the individual movement electrodes within the electrode groups allows for more precise control of the ion position within the ion movement system.

FIG. 1 is a logical diagram illustrating ion trap system 100 with an ion movement system according to some embodiments. The ion trap system 100 has one or more ion trap areas 104A-104D, that may each include ion movement systems, and which are configured (in part) to shuttle ions between target areas such as an ion reservoir 106, ion read-out area 108, and other areas such as ion disposal areas (not shown), processing areas 110, and between the ion trap areas 104A-104D. The ion trap system 100 may also have one or more movement controllers 102A-102D electrically connected to the ion movement systems of the ion trap areas 104A-104D to control movement of the ions.

While the system 100 is illustrated with four ion trap areas 104A-104D and four ion movement controllers 102A-102D, with the ion trap areas 104A-104D in a symmetrical arrangement, the system 100 is not limited to such an arrangement. The ion movement controllers 102A-102D provide addressable voltage control of electrodes (e.g., electrode or electrode segments), and are, therefore, configured to control any number of cascaded ion trap areas 104A-104D, in any arrangement.

Additionally, the ion movement controller 102A-102D may be provided as a unitary controller, with a single controller controlling any number or size of the ion trap areas 104A-104D. The ion trap areas 104A-104D may also be cascaded so that additional ion trap areas 104A-104D and ion movement controllers 102A-102D may be connected to existing ion trap areas 104A-104D and ion movement controller 102A-102D to expand the shuttling area, number of ions controlled, and capabilities of the system 100.

The system 100 may also have a voltage compensation system 112 that provides compensation voltages to individual electrodes in one or more of the ion trap areas 104A . . . 104D. The compensation voltages may, in some embodiments, be provided to compensation electrodes separate from other electrodes such as shuttling or movement control electrodes, so that the region of each electrode may have a DC voltage field applied separate from the field provided by the ion movement controller voltages applied to the respective electrodes. Thus, each electrode may have one or more associated compensation electrodes. The voltage compensation system 112 may provide voltages at the compensation electrodes to compensate for the deviation from target voltage provided by the DAC when the E-field voltage is applied to the electrodes. Additionally, the voltage compensation system 112 may provide the voltage to the compensation electrodes as an electrostatic voltage by, for example charging a capacitor connected to the compensation electrodes, and then disconnecting the capacitor and the compensation electrode from a charging or discharging circuit. When disconnected, the capacitor stays charged for a relatively long time, so that the charge may be periodically adjusted, refreshed, updated or otherwise maintained. This permits many compensation electrodes to be serviced by a single DAC. Alternatively, the voltage compensation system 112 may provide a voltage to a capacitor connected to individual electrodes within the electrodes. In accordance with some embodiments, the compensation electrodes may be held at a constant voltage even when the voltage applied to the shuttling or movement control electrodes is being altered.

Additionally, the voltage compensation system 112 may provide different voltages to a set, or a pair, of compensation electrodes or groups of compensation electrodes, which permits lateral shifting of an ion to align the DC trapping point with the RF trapping point.

Use of separate, dedicated electrostatic charges for separate compensation electrodes or electrodes permits a few, or even one, DAC to charge capacitors for a large number of electrodes and provide a different voltage compensation for each compensation electrode or electrode.

In another embodiment, switching the voltage on individual electrodes within a group of electrodes allows for direct adjustment of the E-field provided by the electrodes which may be utilized to provide compensation in conjunction or without the use of the specific compensation electrodes. In the embodiment where the compensation is provided by adjusting individual electrodes within the electrodes without the use of the compensation electrodes, the number of DACs within the ion trap environment may be even further reduced while maintaining precise control.

Similar to the arrangement of the ion movement controllers 102A . . . 102D, the voltage compensation system 112 may be a unitary system or controller where a single voltage compensation system 112 drives multiple ion trap areas 104A-104D, or may include multiple sub-systems that each drive one or more ion trap areas.

The system 100 may have a radio frequency (RF) system (not shown) that provides an RF containment field separately from the DC bias of the ion movement electrodes and from the DC electrodes. The RF field may be provided by electrodes that are separate from electrodes used to provide keeping voltage fields or compensation voltage fields. In some embodiments, the RF field may be operated at around 200 volts, and 20 megahertz (MHz), and the DC fields may be provided locally and separately to shuttle ions being contained by the RF field.

Figure 2:
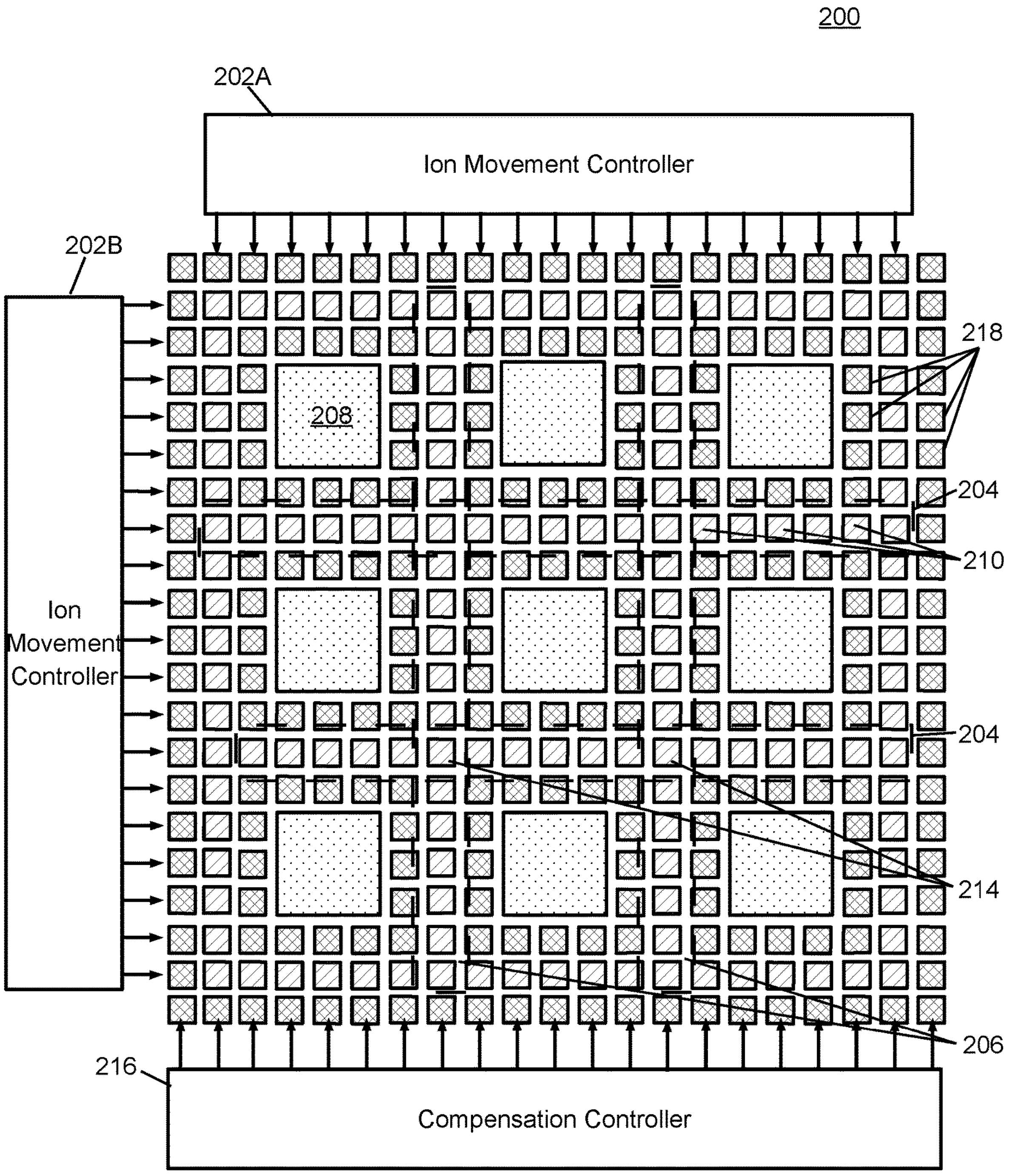
FIG. 2 is a diagram illustrating the ion movement system with electrodes and variable compensation electrodes for ion movement according to some embodiments.

FIG. 2 is a diagram illustrating an ion shuttling system 200 according to some embodiments. The ion shuttling system 200 includes an ion movement controller 202 comprising a first ion movement controller portion 202A and a second ion movement controller portion 202B. The first ion movement controller portion 202A and the second ion movement controller portion 202B may be connected to a set of movement electrodes forming electrode groups 210 (e.g., the electrodes or electrode segments) arranged in a two-dimensional pattern, or in another arrangement with one dimension, or in three dimensions, for example, ion trap systems that may have stacked or layered patterns. In some embodiments, the stacked or layered patterns may include multiple stacked or layered substrates or chips with embedded electrodes (see e.g., FIG. 6A).

In one embodiment, the ion shuttling system 200 may further have a compensation controller 216 connected to a set of compensation electrodes 218. While the electrode groups 210 and compensation electrodes 218 are generally shown with a pair of compensation electrodes 218 and a single electrode group 210 between the associated compensation electrodes 218, the provided compensation electrode 218 arrangement is illustrative of the principles of the ion shuttling system 200 with compensation electrodes 218, and is not limiting. For example, the system 200 may have a single layer, or multiple layers, of electrode groups 210, and compensation electrodes 218. In another embodiment, the compensation controller 216 is connected to both the electrode groups 210 and the compensation electrodes 218. Additionally, while the electrode groups 210 are shown as a single element, the electrode groups 210 may be formed from multiple electrodes, and different voltages may be applied to electrodes to form the electrode groups 210. Similarly, the compensation electrodes 218 are not limited to being formed as singular electrodes, as each compensation electrode 218 shown in the system 200 may be a compensation electrode group formed from multiple compensation electrodes.

Further, in yet another embodiment, the compensation electrodes 218 are not present and either the ion movement controller 202 or the compensation controller 216 is connected to the electrode groups 210 and may provide compensation to the E-field of the electrode groups 210 by controlling the voltage on individual electrodes or electrodes within the electrode groups 210. The ion shuttling system 200 may also have additional electrodes such as RF electrodes (not shown) disposed adjacent to, or between the electrode groups 210. In some embodiments, the ion shuttling system 200 may have a lane element (not shown) along which an ion may be shuttled. In some embodiments, more than two compensation electrodes 218 may be associated with a particular shuttling electrode group 210, and a pair or set of compensation electrodes 218 may be associated with multiple electrode groups 210. For example, one or more electrode groups 210 may each have four associated compensation electrodes 218, with two compensation electrodes 218 on each side of the particular electrode group 210. In another example, multiple electrode groups 210 may share, or be associated with, the same set or pair of compensation electrodes 218, with a single compensation electrode 218 extending along a side of multiple electrode groups 210, and a second compensation electrode 218 extending along another side of the electrode group 210 so that multiple electrode groups 210 are located between a pair or set of compensation electrodes 218.

The ion movement controller 202 provides a direct current (DC) voltage to the individual electrodes or electrodes of the electrode groups 210 to move and steer ions along shuttling lanes 204, 206 by incrementally shifting the confinement fields holding the ions along the shuttling lanes 204, 206. The ion movement controller 202 provides a voltage to each movement electrode or electrode segment within the electrode group 210.

The ion movement controller 202 may address the individual movement electrodes forming of each electrode group 210 itself, and may provide a voltage signal or other signal to set the voltage profile for a particular electrode group 210 through setting the voltage on the movement electrodes within the electrode group 210. Thus, the voltage profile of each electrode group 210 may be set individually and altered by switching the voltage on the individual movement electrodes within each electrode group 210.

In some embodiments, the ion movement controller 202 addresses the individual electrodes or electrode segments within each electrode group 210 using an electrode control or addressing system, which controls application of a voltage to the movement electrodes or electrode segments within the electrode groups 210. Thus, the electrode group 210 in a particular column and row may have a voltage that is set by routing a voltage controlled by a DAC to each of the movement electrodes or electrode segments within the respective electrode group 210.

In other embodiments, an RF field generated by voltages applied to the RF electrodes may hold an ion in controlled position relative to the electrodes, or over a lane element, where present. The DC shuttling field provided by the electrode groups 210 may be shifted by shifting the electrode groups 210 by switching the voltage set on the movement electrodes within adjacent electrode groups 210 thereby causing the confinement field holding the ion to move along the shuttling lanes 204, 206, and thereby moving the ion along the shuttling lanes 204, 206, and the DC compensation field provided by either the compensation electrodes 218 or by switching individual electrodes within the electrode groups 210 adjusts the DC field provided by the electrode groups 210 and shifts the ion in a direction substantially perpendicular to the movement direction provided by the shifting of the DC field provided by the electrode groups 210 along the shuttling lanes 204, 206.

In some embodiments, movement or shuttling of the ion is performed by setting a DC voltage on each electrode within the electrode group 210 to create individual voltage profiles associated with each electrode group 210 forming the E-field, with the control of the individual voltage profiles forming a confinement field from the E-field allowing for control of the position of the ion along, or parallel to the shuttling lanes 204, 206. Changing the voltage on the movement electrodes within the electrode group 210 permits control of the movement of the ion through the shifting of the confinement field, and ions may be moved along shuttling lanes 204, 206 by shifting the electrode groups 210 along the shuttling lanes 204, 206, thereby shifting the confinement fields formed by the E-field. The shuttling lanes 204, 206 may be arranged so that shuttling lanes 204, 206 cross to form intersections 214 to allow for switching the ion onto different shuttling lanes 204, 206 for two dimensional movement. The electrode groups 210 may be arranged so that free space is created between the electrode groups 210, and shield elements 208 may be provided to shield the electrode groups 210 and ions located in shuttling lanes 204, 206, from voltages provided for other ions in other locations along the shuttling lanes 204, 206. Such an arrangement may reduce cross-talk between ions in the shuttling system 200 and simplify production of the shuttling system 200. Additionally, while the shuttling lanes 204, 206 and electrode groups 210 are arranged in FIG. 2 in a symmetrical pattern, the electrode groups 210 and shuttling lanes 204, 206 are not limited to such an arrangement, as any arrangement in two dimensions may be provided, including an arrangement where shuttling lanes 204, 206 intersect or cross at non-right angles. Additionally, shuttling lanes 204, 206 are not limited to crossing each other, as the shuttling lanes 204, 206 may form a three way, or "T" intersection, or may form a turn or angle, such as an 'L' shaped intersection.

Figure 3:
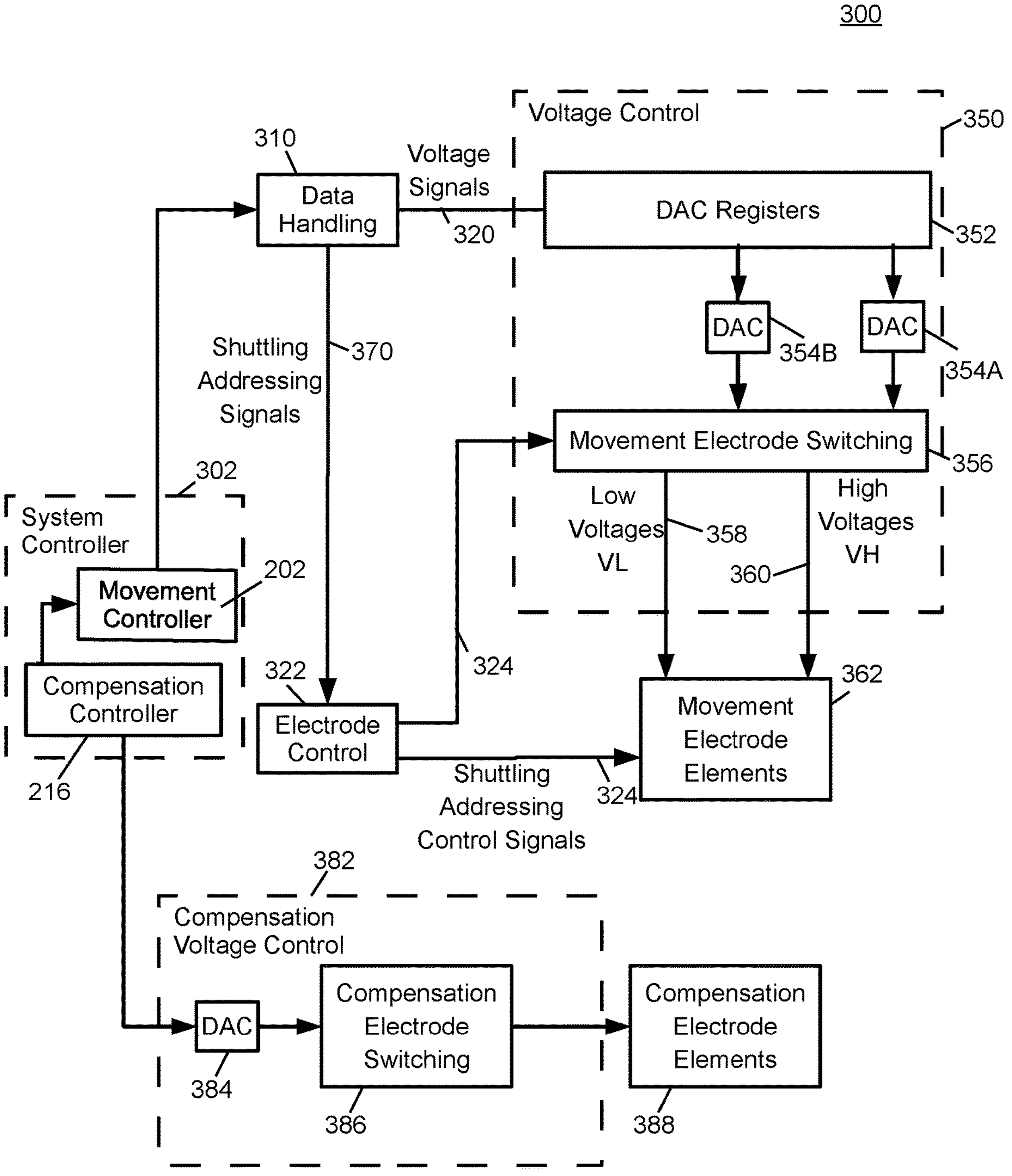
FIG. 3 is a diagram illustrating an ion movement control system and compensation voltage system according to some embodiments.

FIG. 3 is a diagram illustrating an ion movement control system 300 according to some embodiments. The ion movement control system 300 may have a data handling element 310 that receives data from the ion movement controller 202 of a system controller 302, and provides voltage signals 320 or data values to a voltage control 350 and addressing signals or values to an electrode control 322. The voltage control 350 generates voltages, with the voltages applied to electrode elements 362 (e.g., the movement electrodes) for creating the voltage profiles at the electrode groups 210. The electrode control 322 provides signals to the electrode elements 362 to activate particular electrode elements 362 to load or set the voltage provided by the voltage control 350.

In some embodiments, the ion movement controller 202 may indicate ion control information to a data handling element 310. The ion control information may contain, in some embodiments, a location for an ion within an ion trap, one or more voltages or voltage profiles for one or more electrode elements 362, data indicating a path for ion movement or the like. Thus, the ion movement controller 202 may determine where the electrode group 210 is located, and may identify or provide information for identification of the electrode elements 362 of the electrode group 210. Additionally, the ion movement controller 202 may provide information for movement voltage or the like, so that the system may determine the shifting of electrode groups 210 and the associated confinement field in the E-field provided by the electrode groups 210 for controlling ion movement.

The data handling element 310 may receive, and in some embodiments, decode, ion control information from the ion movement controller 202. The ion control information may include, for example, one or more voltage values and associated addresses, and the data handling element 310 may determine the electrode group 210 to be addressed and the associated electrode elements 362 to be set with the associated voltage, and may provide shuttling addressing signals 370 to the electrode control 322, and provide an ion movement control voltage to the voltage control 350.

In some embodiments, the voltage values may include information, data, values for a low voltage profile, or values for a high voltage profile for holding an ion on a particular location (e.g., within the confinement field associated with one of the electrode groups 210 having the low voltage profile).

In some embodiments, the ion control information may include an explicit address for a particular associated voltage level, and the ion control information may indicate explicit addresses and voltages for each electrode element 362 being set for a particular voltage profile associated with the corresponding electrode group 210. The voltage level may be indicated as an explicit voltage level as an integer or real number (e.g., +5 volts, +10 volts, +40 volts, etc. for associated high voltage profiles and −5 volts, −10 volts, −40 volts for associated low voltage profiles). In some embodiments, the voltage level may be 0 volts and is associated with either the low voltage profile or the high voltage profile and has a corresponding non-zero voltage level for the complementing voltage profile. In other embodiments, the voltage level may be indicated by an index that determines the voltage level from a predetermined formula, table, or the like. For example, the voltage may be indicated by an index, which may be used to reference a table indicating a desired voltage value, or may be used in a calculation to determine the desired voltage, for example, by multiplying the index by a voltage factor to determine the desired voltage level.

In other embodiments, the ion control information may define a voltage profile and a base location for each of the electrode elements 362 forming the electrode groups 210. The voltages for multiple electrodes elements 362 determine the voltage profile for each electrode group 210. For example, a voltage profile may have predetermined voltages for the electrode elements 362 making up each of the electrode groups 210, with a first electrode group at +10 v, a second electrode group at −10 v, a third electrode group 210 at +10 v, and a fourth electrode group at −10 v, and so forth (it should be noted that these voltages are illustrative and any appropriate voltages may be utilized). In some embodiments, the ion control information may describe an address for one or more of the electrode elements 362 for each of the electrode groups 210, and the voltage for each electrode element 362 of the voltage profile for each of the electrode groups 210 may be determined based on the electrode group's 210 relative location to address based on the predetermined voltages for the voltage profile.

In another embodiment, the ion control information may also describe a movement direction for the voltage profile associated with a confinement field (e.g., a low voltage profile) of one of the electrode groups 210 may be shifted by switching the voltage on an electrode element 362 from one of the electrode groups (e.g., the first electrode group) to the voltage associated with the voltage profile of another one of the electrode groups (e.g., the second electrode group) thereby shifting the location of the associated electrode group and corresponding voltage profile of the associated electrode group 210. In some embodiments, the ion control information may also include a path, speed or movement profile for the ion so that a voltage may be set by the decoder based on a time function, with, for example, new electrode voltages being set every time step to move the voltage profile or change the voltages, causing the ion to move along the identified path or in the identified direction.

In some embodiments, the voltage control 350 may comprise DAC registers 352, DACs 354, such as a low voltage DAC 354A and a high voltage DAC 354B (high voltage as compared to low voltage), and a movement electrode switching complex 356. The DAC registers 352 hold digital voltage values for the DACs 354 (e.g., a low digital voltage value, a high digital voltage value), and the DACs 354 convert the digital voltage values to analog voltage values or signals. The DAC registers 352 may be used to hold the voltages long enough for the DACs 354 to propagate an analog voltage through themselves and through the movement electrode switching complex 356 to be provided to by the electrode elements 362. The analog voltage values may be sent to the movement electrode switching complex 356 that receives addressing information to route particular voltages to particular electrode elements 362 within the electrode group 210. The low voltage DAC 354A may be set with a low voltages VL 358 and the high voltage DAC 354B may be set with a high voltages VH 360. In an embodiment, the low voltages VL 356 may be variable such as +2 v, +5 v, etc., while the high voltages VH 360 may be constant such as +10 v, thereby the high voltages VH 360 forming neutral voltage profiles defining the confinement field associated with low voltage profiles. Each electrode group 210 being defined by have a voltage profile associated with either the low voltage VL 358 or the high voltage VH 360. Each electrode element 362 is configured to receive a voltage from either the low voltage DAC 354A or the high voltage DAC 354B, with the movement electrode switching complex 356 determining which electrode elements 362 receive which voltage, thereby defining the electrode groups 210 by their associated voltage profile. Thus, multiple electrode elements 362 may have associated electrodes that are all set to the same voltage to form an electrode group.

In an embodiment, the electrode elements 362 set to the high voltage VH 360 may be high voltage electrode elements 362A and the electrode elements 362 set to the low voltage VL 358 may be low voltage electrode elements 362B. Thus, electrode groups 210 having the low voltage profile are adjacent to electrode groups having the high voltage profile (e.g., the neutral voltage profile) resulting in a confinement field for holding an ion on a particular location is formed associated with a specific electrode group 210 having the low voltage profile. A position of the confinement field associated with the specific electrode group have the low voltage profile may be incrementally shifted along the shuttling lanes 204, 206 by switching the voltage on electrode elements 362 within specified electrode groups 210. Switching the voltage set on individual electrode elements 362 within the electrode groups 210 shifts the associated voltage profile of the electrode group 210 and shifts the corresponding confinement field. In an embodiment, shifting the confinement field is performed by switching individual electrode elements 362 between voltages (e.g., the low voltage VL 358 and the high voltage VH 360), which changes the electrode elements 362 that are part of the electrode group, permitting the movement of an ion with a limited number of DACs (e.g., using only two DACs, such as the low voltage DAC 354A and the high voltage DAC 354B).

In some embodiments, the movement electrode switching complex 356 may be an analog multiplexer that selectively passes on analog voltages rather than simply providing digital output levels. Additionally, the analog multiplexer may be configured to allow selection between routing the low voltage VL 358 and routing the high voltage VH 360 to each of the electrode elements 362 as determined through the shuttling addressing control signals 324 provided by the electrode control 322. However, any system of switching circuitry may be utilized to provide the desired voltage signal to the desired electrode element 362 in conjunction with the information provided by the electrode control 322.

The electrode control 322 may provide a control signal that selects one or more DACs 354 used to provide one or more voltages to selected electrode elements 362. In some embodiments, the movement electrode switching complex 356 may selectively provide the high voltage VH 360 selected from a plurality of high voltages VH 360 on a first output for the electrode elements 362 for a particular electrode group 210 (e.g., the first electrode group), and the low voltage VL 358 selected from a plurality of low voltages on a second output for the electrode elements 362 for a different electrode group (e.g., the second electrode group). Switching the voltage provided to an electrode element 362 within an electrode group redefines the location of the electrode group along the shuttling lane with an electrode enable signal ESEL provided to the electrode element 362 to be used to select between the high voltage VH 360 and low voltage VL 358 for application to the electrode groups, and allows each electrode element 362 to be selectively set to the high voltage VH 360 or the low voltage VL 358 using the electrode enable signal. Thus, the DACs 354 may provide the high voltage VH 360 that is used to set electrode elements 362 for selected electrode groups 210 and the low voltage VL 358 for other selected electrode groups, and shifting the holding point by shifting the electrode groups 210 by switching between the low voltage VL 358 and the high voltage VH 360 set to different electrode elements 362 within different electrode groups. In some embodiments, the electrode control 322 receives the shuttling addressing signals 370 indicating which electrodes elements 362 are switched.

In some embodiments, the system controller 302 further has a compensation controller 216 that provides a signal having compensation control information describing locations and compensation voltages for one or more compensation electrode elements 388. The compensation control information may be used to set an output voltage of a voltage source, such as DAC 384, that may be routed, or selectively connected, by a compensation electrode switching element 386 to one or more selected compensation electrode elements 388 identified in the compensation control information, or by the compensation controller 216. In some embodiments, the compensation electrode switching element 386 may have one or more switches, such as transistors, that are controlled by a signal from the compensation controller 216 to selectively connect the DAC 384 to the selected compensation electrode element 388. In some embodiments, the compensation electrode switching element 386 may, in some embodiments, connect a single DAC 384 to multiple compensation electrode elements 388 at the same time so that the single DAC 384 applies the same voltage to multiple electrodes or electrodes to form a compensation electrode group. Thus, the DAC 384 may receive digital information describing a compensation voltage, which is converted into an analog voltage by the DAC 384, and is provided to one or more compensation electrode elements 388 by one or more connections created by the compensation electrode switching element 386. In another embodiment, the compensation controller 216 may provide a signal having compensation control information to the ion movement controller 202 that provides compensation by switching the voltage received by an electrode element 362 serving as a compensating electrode.

Figure 4A:
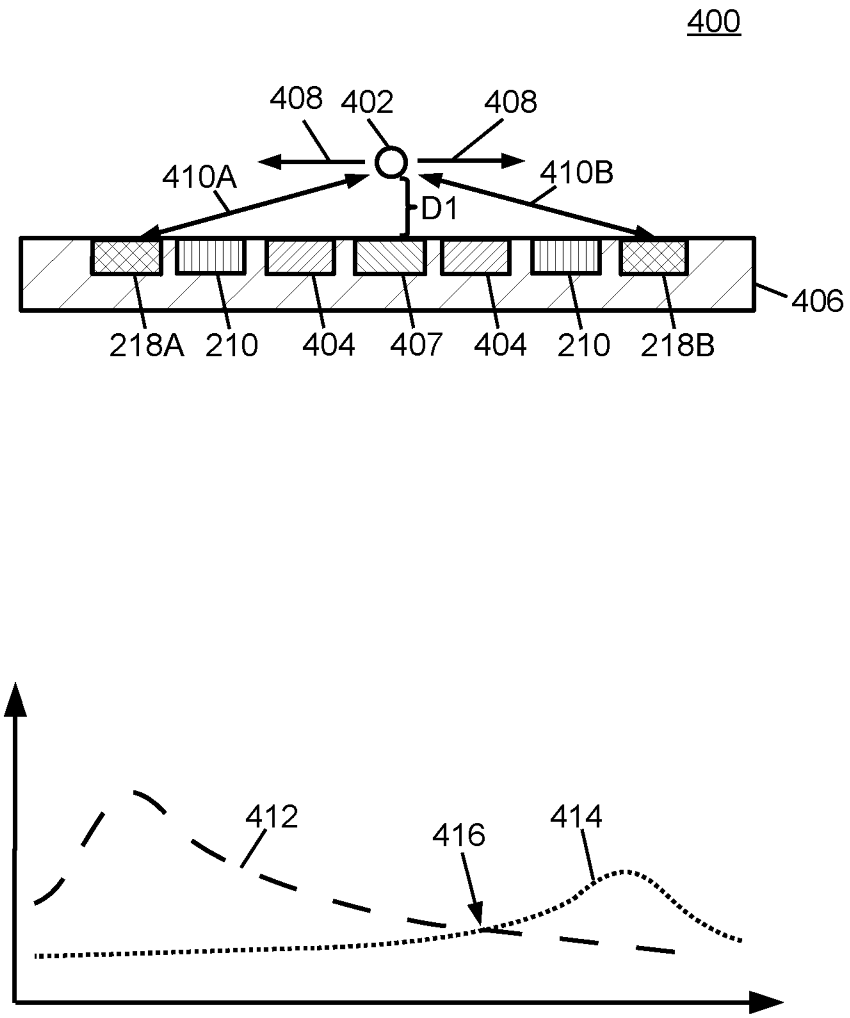
FIGS. 4A-4C are diagrams illustrating a two-dimensional (2D) ion movement system with outer movement electrodes forming the electrodes for the ion movement according to some embodiments.

FIGS. 4A-4E are diagrams illustrating a 2D ion shuttling system 400 with outer compensation electrodes 218A, 218B and movement electrodes split along the trap axis according to some embodiments. FIG. 4A is a diagram illustrating a cutaway view of a 2D ion shuttling system 400 with outer compensation electrodes 218A, 218*b* and an E-field profile in a compensation direction 408. In some embodiments, the ion shuttling system 400 may be formed using semiconductor packaging or fabrication techniques, for example, by depositing conductive material on a substrate and forming electrodes, lane elements, shields, connectors, and the like, in, for example, glass or oxide layers. Additionally, connection layers, such as layers of conductive wiring, may be formed as a stack or on the backside of the system to provide connections to control elements such as multiplexers, DACs, and the like. One or more other devices, such as transistors, or logic gates, or other circuits may also be formed or located on the surface of the system substrate 406, on the backside of the substrate 406, on the wiring layers, or the like, to permit integration of the system elements into a package or system-on-chip (SoC). Additionally, any analog or digital circuit may be integrated with the passive part of the ion trap consisting of electrodes and wiring, and integration may be done on the same substrate or using stacked dies.

In the 2D ion shuttling system 400, one or more metal elements may be formed in a metallization layer, for example, using a damascene etch-and-fill process. The metallization layer may have a substrate 406 such as an insulator layer, that may be, for example, a silicon dioxide, glass, or other insulating material. Compensation electrodes 218A, 218B, RF electrodes 404, RF ground electrodes 407 and the electrode elements (not separately illustrated) forming the electrode groups 210 may be formed in the metallization layer, and may be a conductive material such as copper, aluminum, gold, a metal alloy, ceramic or silicide, or another conductive material. Additionally, while not shown, connecting wiring may be provided in one or more additional metallization layers on the backside of the substrate 406 or insulator layer to connect the compensation electrodes 218A, 218B, RF electrodes 404, RF ground electrodes 407 and the electrode elements 362 forming the electrode groups 210 to each other or to other elements, such as compensation switches, controllers, DACs, or the like. In some embodiments, an RF signal may be applied to the RF electrodes 404 by an RF generation system (not shown) and RF ground electrodes 407. However, in some embodiments, the compensation electrodes 218A, 218B and shuttling electrodes groups 210 may act as RF ground electrodes in place of, or in addition to, a discrete RF ground electrode 407. The RF signal on the RF electrodes 404 creates an RF field to trap the ion 402 in a desired position. In an embodiment, the RF trapping field formed by the RF electrodes 404 and the RF ground electrode 407 trap the ion 402 at a first distance D1 from the substrate 406 along the trap axis. In some embodiments, the first distance D1 is fixed by the geometry of the RF electrodes 404 forming the RF field, which in some embodiments, is in a range between 75 microns and 200 microns, and in some embodiments, for example, 100 microns, or about 100 microns. In some embodiments, the first distance D1 may be proportional, or approximately proportional to a square root of the width of the RF electrodes.

Compensation voltages applied to the compensation electrodes 218A, 218B and applied to individual electrode elements 362 may shift the ion 402 laterally along the compensation direction 408 by generating different individual compensation fields in component compensation directions 410A, 410B. Each compensation electrode 218A, 218B and individual electrode element 362 within one of the electrode groups 210 may generate a component compensation field in a respective component compensation direction 410A, 410B to adjust the positioning of the ion 402 along a plane of the compensation direction 408, which is perpendicular to a movement direction. For example, a first compensation electrode 218A generates a field that attempts to adjust the ion 402 along a first component compensation direction 410A, while a second compensation electrode 218A, which is at a different angle to the ion than the first compensation electrode 218A, generates a second field that attempts to move the ion 402 along a second component compensation direction 410B. A higher voltage on one of the respective compensation electrode 218A, 218B will push the ion 402 away from the respective compensation electrode 218A, 218B, and a lower voltage will pull the ion 402 closer. The net adjustment or movement of the ion 402 can therefore be made along the plane of the compensation direction 408 by adjusting a difference in the voltages of the compensation electrodes 218A, 218B. Additionally, switching the set voltage of one electrode element 362 within one electrode group 210 (e.g., the electrode group 210 in the first component compensation direction 410A) from the low voltage to the high voltage or vice versa can adjust the ion 402 along the compensation direction 408.

The E-field profile illustrates two E-fields 412, 414, with a first E-field generated as a result of applying a first compensation voltage to a first compensation electrode 218A. A second, smaller E-field is generated as a result of applying a second compensation voltage smaller than the first compensation voltage. The overlapping E-fields 412, 414 form a compensation trapping point 416. The ion 402 tends to shift along the compensation direction to reach the compensation trapping point 416, and thus, adjusting the difference between the first and second compensation voltages changes the relationship of the first and second E-field 412, 414, moving the compensation trapping point 416 and shifting the ion position along the plane of the compensation direction 408. In an embodiment, the same effect may be achieved by creating a voltage differential between electrode groups 210 on opposite sides of the RF ground electrodes 407.

Figure 4B:
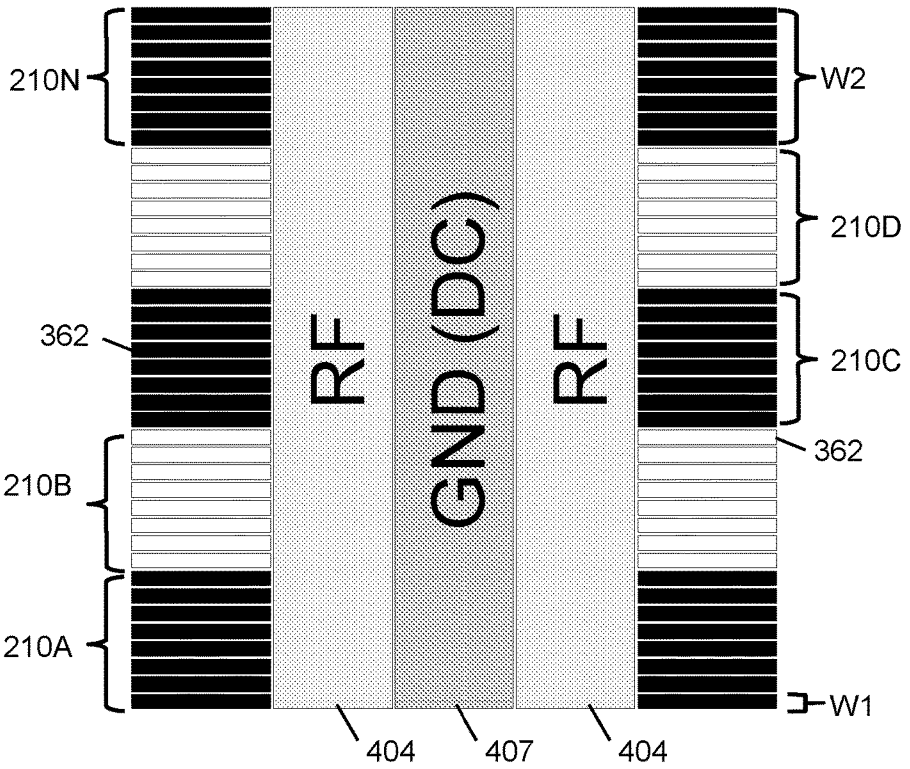
Figure 4C:
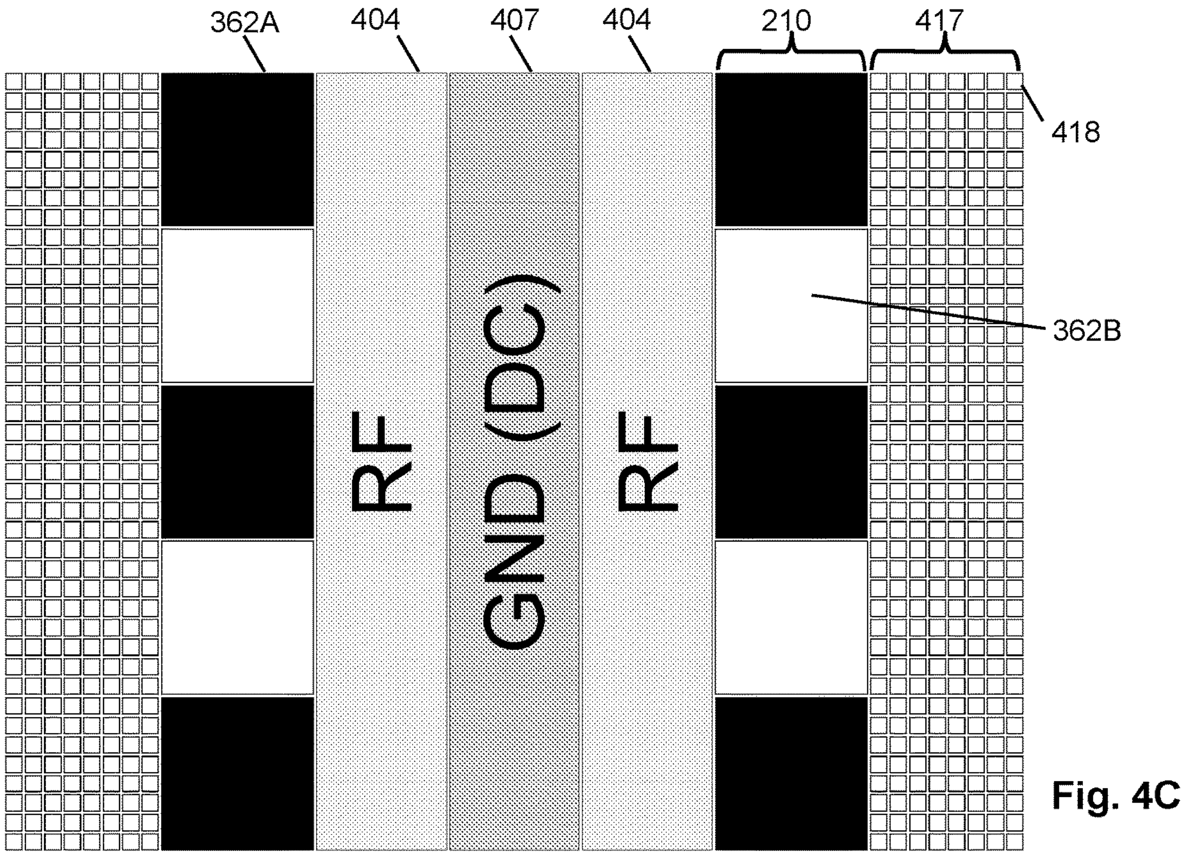

FIGS. 4B-4C are diagrams illustrating a 2D ion shuttling system 400 with outer electrode groups 210 split along the trap axis according to some embodiments. FIG. 4B is a top view illustrating the 2D ion shuttling system 400 with outer electrode groups 210 split along the trap axis according to some embodiments. In this embodiment, the electrode groups 210 are disposed on opposite sides of the RF electrodes 404 and the RF ground electrode 407 that provide the RF field that traps the ion 402 (not separately illustrated) above the substrate. Additionally, as illustrated in FIG. 4B the outer electrode groups 210 are defined by the voltage profile set on the individual electrode elements 362 by the voltage control 350. For example, each of the electrode elements 362 within the electrode group 210B on both sides of the ion trap axis is set to the low voltage VL 358 so that the voltage profile of the electrode group 210B has a low voltage profile, while each of the electrode elements 362 within the electrode groups 210A and 210C on both sides of the ion trap axis are set to the high voltage VH 360 so that the voltage profile of the electrode groups 210A and 210C have a high voltage profile. In this embodiment, a neutral voltage profile or confinement voltage profile is formed by the E-field provided by the electrode groups 210 located within the low voltage profile associated with the electrode group 210B, such that the ion 402 is held at the first distance above the trap axis disposed between the electrode group 210B split by the trap axis. In an embodiment, switching the voltage set on mirror electrode elements 362 within the electrode groups 210A (e.g., the electrode elements 362 within the electrode groups 210A adjacent to the electrode elements 362 within the electrode groups 210B) from being set to the high voltage VH 360 to being set to the low voltage VL 358 alters the E-field produced by the electrode groups 210 by shifting the low voltage profile associated with the electrode groups 210B along the shuttling lane 204, 206 towards the lower DC bias resulting from the change in voltage applied to the electrode elements 362 in the electrode groups 210A. In this embodiment, the shifting of the low voltage profile shifts the confinement field along the shuttling lane, thereby shuttling the ion along the shuttling lane 204, 206 in the direction of a lower DC bias associated with the lower voltage profile. Further, in an embodiment, mirror electrode elements 362 within each electrode groups 210 corresponding to the mirror electrode elements 362 within the electrode groups 210A which voltage are switched may also have their voltages switched in each corresponding electrode groups 210. For example, the mirror electrode elements 362 within the electrode groups 210B adjacent to the mirror electrode elements 362 within the electrode groups 210C may be switched from being set to the low voltage VL 358 to the high voltage VH 360, and accordingly, the mirror electrode elements 362 within the electrode groups 210C adjacent to the mirror electrode elements 362 within the electrode groups 210D may be switched from being set to the high voltage VH to the low voltage VL. In this embodiment, the confinement field associated with each electrode group having a low voltage profile remains relatively uniform as the confinement fields are shifted along the shuttling lanes, thereby allowing for the shuttling of multiple ions 402 along the shuttling lanes as the voltage profiles of the electrode groups 210 are shifted by the switching of the voltages on the electrode elements 362 within the electrode groups 210.

In FIG. 4B, the electrode groups 210 are illustrated as having voltage profiles established by electrode elements 362 oriented in a single file array spaced along the trapping axis in a first direction corresponding to the ion movement along the shuttling lanes 204, 206. This embodiment is merely illustrative and the voltage profiles of each electrode groups 210 may be formed by electrode elements 362 oriented in a matrix array spaced apart in at least the first direction. In an embodiment, a first width W1 of each electrode element 362 in the first direction within each electrode group 210 is 0.2× or less than the first distance D1 of the ion 402 trap position provided by the RF field (e.g., the first width W1 of each of the electrode elements 362 may be 0.1×, 0.05×, etc. than the first distance D1 of the ion 402 trap position provided by the RF field). Additionally, each electrode element 362 may have an aspect ratio between about 0.3 and about 0.05, and in some embodiments of about 0.2 or 0.1. Thus, the, the width W1 of an electrode element 362 in the movement direction along the RF electrode 404 may be between about ⅓$^{rd}$ and about 1/20$^{th}$, and in some embodiments, of about 1/10$^{th}$, of the length of the electrode element 362 in a direction extending away from the nearest RF electrode 404.

In an embodiment, each electrode group 210 has a second width W2 in the first direction, where the second width W2 is proportional to the first distance D1 to allow voltage profiles that can adequately control the ion 402 position within the ion trap areas 104A-104D. In the embodiment illustrated in FIG. 4B, each of the electrode groups 210 are formed from mirrored pairs of 8 electrode elements 362, however this number is merely illustrative. In an embodiment, where the electrode elements 362 are oriented in single file in the first direction each electrode group 210 on each side of the ion trap axis may have electrode elements 362 in a range from 1×6 electrode elements 362 to 1×12 electrode elements 362. In an embodiment, where the electrode elements 362 are oriented in a matrix array in at least the first direction each electrode group 210 on each side of the ion trap axis may have electrode elements 362 in a range from 3×6 electrode elements 362 to 40×40 electrode elements 362, for example 6×12, 10×10, 30×30, or another useful arrangement. In the embodiments discussed above, the switching of mirrored pairs of electrode elements 362 within each electrode groups 210 is able to provide precise incremental ion shuttling along the ion shuttling lane 204, 206 while simultaneously able to reduce the number of components utilized in the ion trap areas by switching voltages on smaller electrodes of the electrode elements 362 to shift the location in the first direction of the confinement field produced by the electrode groups 210 alternating between having associated low voltage profiles and associated high voltage profiles and the shifting of these associated voltage profiles by the switching of the smaller electrodes of the electrode elements 362.

FIG. 4C is a top view illustrating the 2D ion shuttling system 400 with outer electrode groups 417 split along the trap axis utilizing electrodes that are separated in multiple dimension as compensation electrode elements 418 according to some embodiments. In this embodiment, each of the electrode groups 210 has electrode elements 362 responsible for establishing the voltage profile of the specific electrode group 210 as either having a low voltage profile or a high voltage profile. The compensation electrode elements 418 are set to a same voltage along the first direction in each electrode group 417 and are mirrored across the ion trap axis. In this embodiment, electrode elements 362 define the voltage profile of each electrode group 210. The compensation electrode elements 418 having the same voltage across each electrode group 417 along the RF trapping field does not impact the location of each confinement field produced by the electrode elements 362 defining the voltage profiles of each electrode groups 210. In this embodiment, stray voltages that may impact the alignment of the RF-trapping point and the DC trapping point may be compensated for by switching the voltage set on one or more of the compensation electrode elements 418 thereby adjusting the E-field associated with the electrode groups 210 by providing a compensating E-field to align the RF trapping point and the DC trapping point. The voltage profile that define electrode elements 362 for each electrode group 210 on both sides of the ion trap axis as being a single large electrode element as opposed to the smaller compensation electrode elements 418 illustrated as providing the compensating field. However, this is merely illustrative, and the voltage profile may be formed from a single electrode element 362, or a plurality of electrode elements 362 oriented in single file or in a matrix as discussed above with respect to FIG. 4C. Further, in accordance with some embodiments, the compensation electrode elements 418 may function similarly to the electrode elements 362, have a geometry similar to the geometry of the electrode elements 362, and may be controlled in a similar manner as the electrode elements 362.

Figure 4D:
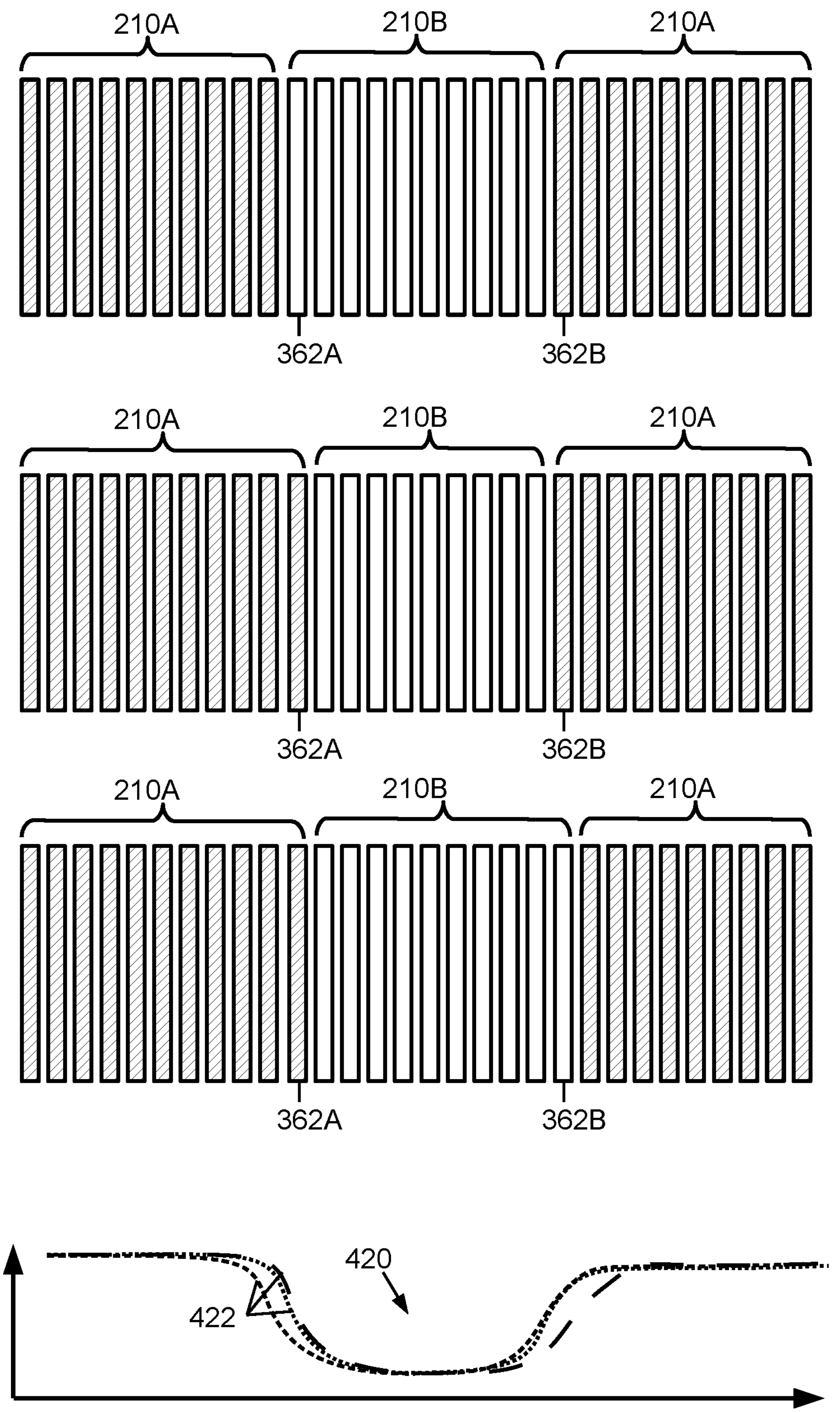
FIG. 4D is a diagram illustrating a voltage profile chart with incremental voltage profile shift and series of diagram illustrating shuttling of electrode groups according to some embodiments.

FIG. 4D is a diagram illustrating a voltage profile chart with incremental voltage profile 422 shift and series of diagram illustrating shuttling of electrode groups 210A, 210B according to some embodiments. In some embodiments, electrodes are segmented in a single direction along an axis of ion movement, or along an RF electrode. In this embodiment, the electrode groups 210A, 210 are defined by the voltage applied to constituent electrodes. For example, first electrode groups 210A may have a first voltage, such as a high voltage, applied to each electrode in each of the first electrode groups 210A. A second electrode group 210 may have electrodes with a second voltage, or low voltage, that is different form the first voltage, applied to each of the electrodes of the second electrode group 210B. The first electrode diagram illustrates a first electrode 362A in the second electrode group 210B, with the first electrode 362A having the second voltage applied thereto. In order to shift an ion trapping area 420 created by a voltage profile resulting from the first and second voltages being applied to the first electrode groups 210A and second electrode group 210B, the electrodes that are part of the different electrode groups 210A, 210B. For example, in some embodiments, the first electrode 362A may be switched from the second electrode group 210B to a first electrode group 210A, and a second electrode 362B opposite the second electrode group 210B from the first electrode 362A may be switched from a different first electrode group 210A to the second electrode group 210B. Thus, as shown in the second electrode diagram, the first electrode 362A may be switched to be part of a first electrode group 210A by changing the voltage applied to the first electrode 362A from the second voltage associated with the second electrode group 210B to the first voltage associated with the first electrode group 210A. Additionally, as shown in the third electrode diagram, a second electrode 362B associated with a different first electrode group may be switched to be part of the first electrode group 210A by changing the collate applied to the second electrode 362B from the first voltage associated with the first electrode group 210A to the second voltage associated with the second electrode group 210B. Thus, the voltage profile 422 created by the electrode groups 210A, 210B ban be incrementally sifted, and using electrodes groups having electrodes with relatively high aspect ratios permits the voltage profiles 422, and resulting ion trapping area 420, to be incrementally moved under precise control to avoid heating an ion. Additionally, while the electrode diagrams illustrate the electrodes 362A, 362B being switched between electrode groups 210, 210B in sequence, it should be understood that the systems and methods described herein are not limited to such an arrangement, as multiple electrodes may be substantially simultaneously switched, for example, with the first and second electrodes 362A, 362B being switch at substantially the same time, or with multiple first electrodes 362A or multiple second electrodes 362B being switched at substantially the same time.

Figure 4E:
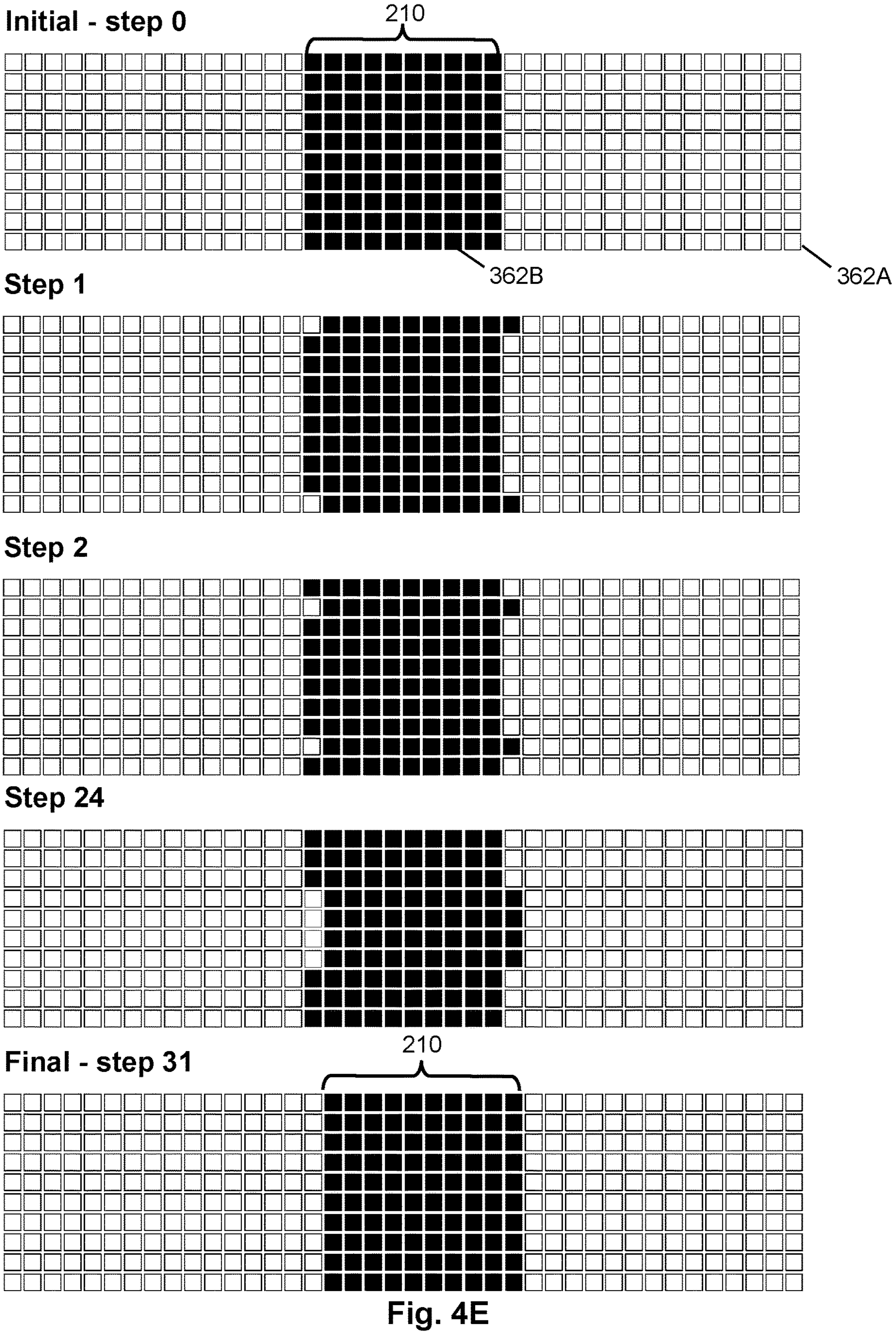
FIG. 4E illustrates diagrams of an electrode shifting through a series of steps involving switching voltages on the movement electrodes within the electrodes according to some embodiments.

FIG. 4E is a series of diagrams illustrating the incremental voltage profile shift associated with a multi-dimensional electrode group 210 according to some embodiments. In some embodiments, electrodes may be segmented in multiple dimensions, which may permit the precise control of the location of the confinement field as performed by the systematic switching of the voltages set on electrode elements 362. In this embodiment, the electrode group 210 is defined by the low voltage electrode elements 362B abutted by high voltage electrode elements 362A. Step 0 illustrates the initial position of the electrode group 210 and corresponding location of the confinement field where the ion 402 (not separately illustrated) will be held. Step 1, Step 2 . . . Step 24 illustrate the systematic switching of the voltages set on individual electrode elements 362 between being set to the high voltage electrode element 362A to being set to the low voltage electrode elements 362B, and the corresponding switching of the voltages set on individual electrode elements 362 between being set to the low voltage electrode element 362B to being set to the high voltage electrode element 362A. This switching incrementally shifts the location of the electrode group 210 defining the confinement field holding the ion and shuttles the ion 402 with it. Step 31 illustrates after a series of voltage switching the resulting uniform shift along the shuttling lane 204, 206 (not separately illustrated) of the electrode group 210. The incremental shifting of the confinement field by the switching of voltages set on individual electrode element 362 pairs allows for precise and systematic control of the ion 402 position within the ion trapping areas 104A-104D. In an embodiment, the incremental voltage profile shift used to control the location of the confinement field may be utilized to shuttle the ion 402 along the shuttling lanes 204, 206 within the ion trap area 100A-D. Further, in an embodiment, the incremental voltage profile shift may be performed through a binary approach that is vertically symmetric. In this embodiment, the outer most segment is the least significant bit (LSB) and the central segment is the most significant bit (MSB). It should be noted that the incremental voltage profile shift associated with the multi-dimensional electrode group 210 illustrated in FIG. 4E may be applied to the discussion of electrode groups 210 throughout this disclosure, for example, the electrode group 210 illustrated in FIG. 4E may be illustrative of the electrode groups 210B, 210D illustrated in FIG. 4B and the incremental voltage profile shift used to control the location of the confinement field illustrated in FIG. 4E may be applied to the electrode groups 210 illustrated in FIG. 4B. As shown in FIG. 4E many electrodes may be used (e.g., by applying the high voltage as discussed above) to trap and/or shuttle a single ion, such as 10×10 as shown in FIG. 4E. However, any suitable number of electrodes may be used to trap and/or shuttle an ion, such as at least twenty, at least thirty, at least fifty, etc. Using many electrodes (such as at least twenty) to trap and/or shuttle as compared to using only a few electrodes (such as five or six) may allow for simple voltage profiles to be provided from the DAC to the electrodes (such as on/off, or a small group of constant voltages −20V, −10V, 0, +10V, 20V) thereby reducing complexity of the supply electronics (such as the number of DACs needed to trap and/or shuttle an ion).

Figure 4F:
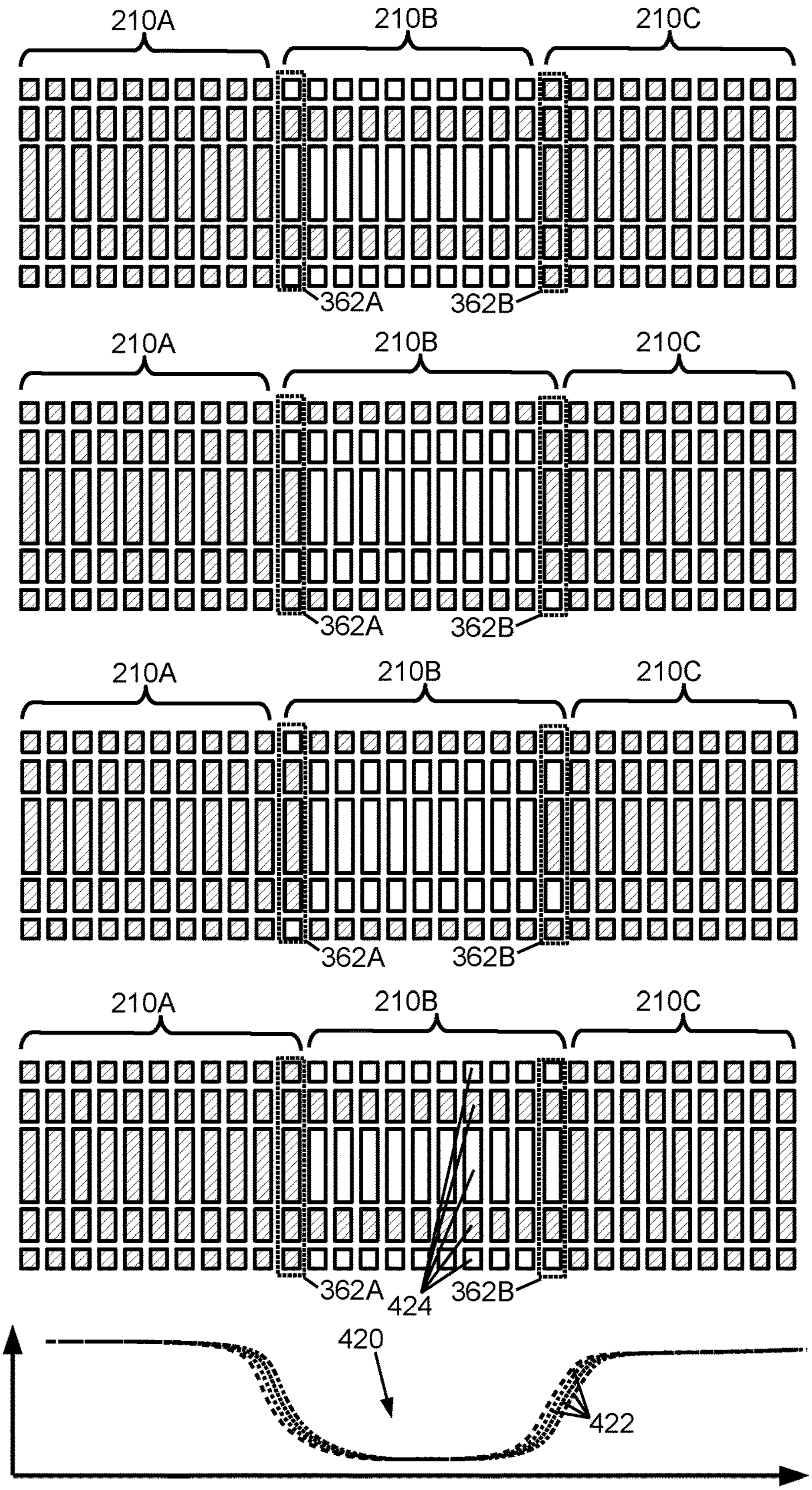
FIG. 4F is a series of diagrams illustrating the incremental voltage profile shift associated with multi-dimensional electrode groups according to some embodiments.

FIG. 4F is a series of diagrams illustrating the incremental voltage profile shift associated with multi-dimensional electrode groups 210 according to some embodiments. In some embodiments, electrodes 424 may be segmented in a first direction, for example, along a movement direction, and may also be segmented in a second direction that is different form the first direction, for example, perpendicular to a direction or movement, or perpendicular to a direction along which an RF electrode extends. However, the electrodes 462 that are aligned in a second direction may have different lengths in the second direction. For example, in an embodiment, there may be three electrodes 462 aligned in the second direction with two different lengths in the second direction, five electrodes 462 aligned in the second direction with three different lengths in the second direction, seven electrodes 462 aligned in the second direction with 5 different lengths in the second direction, etc. This permits different portions of electrode 362A, 362B to be switched with different voltages to provide, for example, different desired voltage profiles 422, as the different sized electrodes 424 contributes to the voltage profile 422 as a result of their overall size, so that for a given voltage, the effect on the overall voltage profile 422 depends on the area of the electrode 424, as well as the distance of the electrode 424 to the ion 402.

As shown in the different electrode diagrams, different combinations of electrodes 424 may be switched between the first and second voltages associated with the first electrode group 210A and the second electrode group 210B to smoothly transition a first electrode 362A from being part of the second electrode group 20B to being part of the first electrode group 210A, and to transition a second electrode group 362B to being part of the second electrode group 210B. Smoothly transiting these electrodes 362A, 362B, results in incremental movement of voltage profiles 422, and incremental movement of the associated in trapping area 420.

Figure 5:
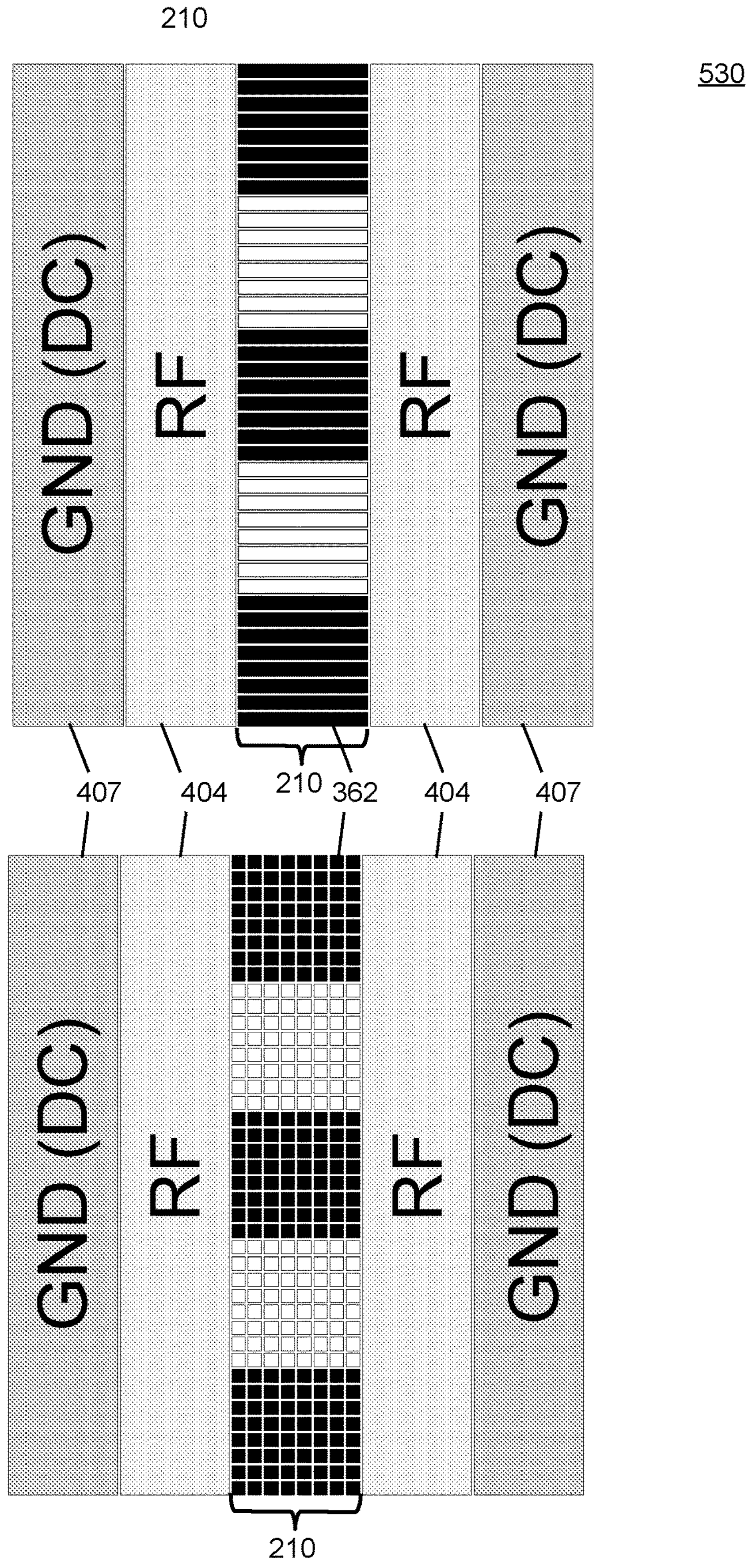
FIG. 5 are diagrams illustrating a 2D ion movement system with inner movement electrodes forming the electrodes for the ion movement according to some embodiments.

FIG. 5 is a diagram illustrating top views of a 2D ion shuttling system 530 with electrode groups 210 disposed between RF electrodes 404 according to some embodiments. The 2D ion shuttling system 530 illustrates an embodiment where the electrode groups 210 are oriented in a single file and spaced apart along the first direction and an embodiment where the inner electrode groups 210 are oriented in a matrix and spaced apart in two dimensions between the RF electrodes 404. The operation and shuttling of the confinement field by shifting the voltage profiles associated with the electrode groups 210 may operate in a similar manner as discussed above with respect to FIG. 4B and with similar geometry and proportions as discussed above with respect to FIG. 4B but for the position of the electrode groups 210 being oriented along the ion trap axis as opposed to being bisected by the ion trap axis.

Figure 6A:
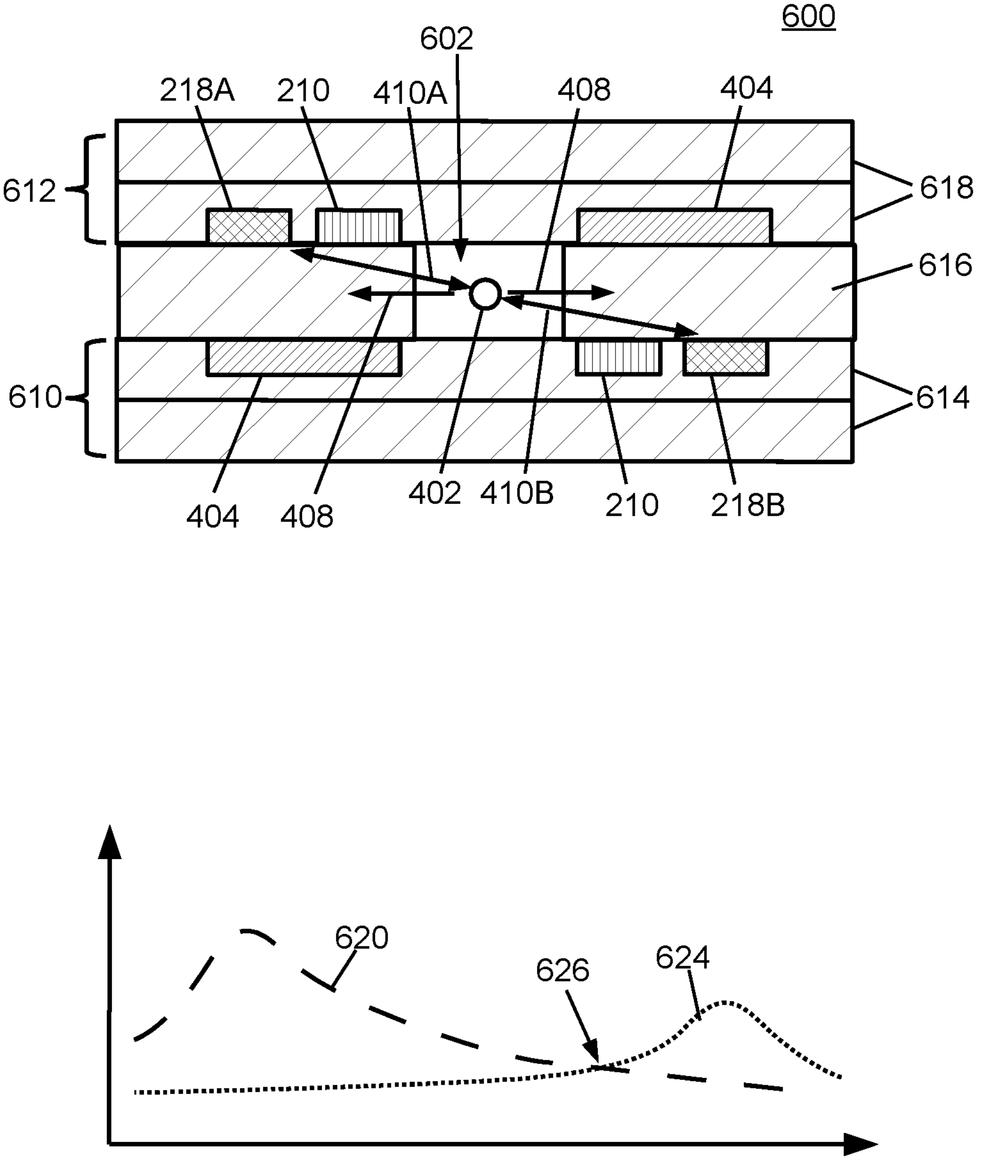
FIGS. 6A-6E are diagrams illustrating a three-dimensional (3D) ion movement system using the movement electrodes forming the electrodes according to some embodiments.
Figure 6B:
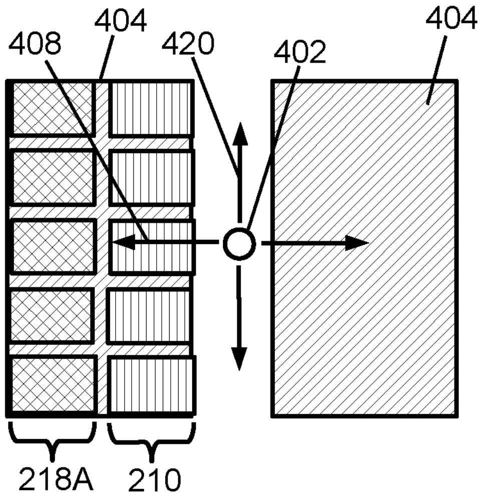
Figure 6C:
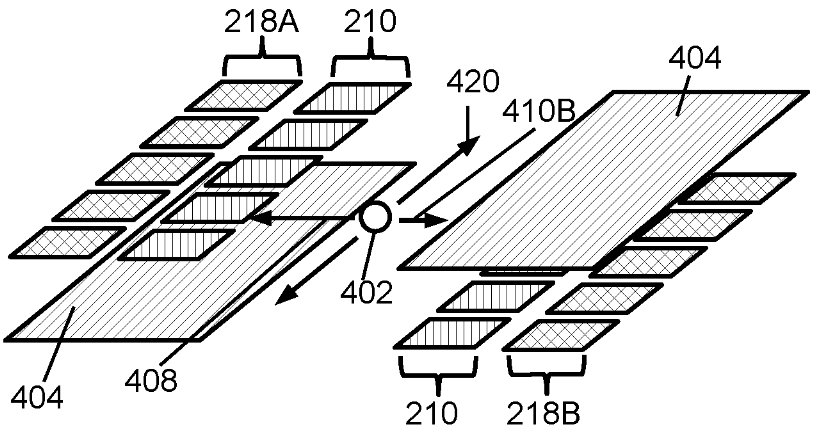

FIGS. 6A-6C are diagrams illustrating a three-dimensional (3D) ion shuttling system 600 with grouped traps according to some embodiments. FIG. 6A is a diagram illustrating a cutaway view of a 3D ion shuttling system 600 with compensation electrodes 218A, 218B and an E-field profile in a compensation direction 408. The 3D ion shuttling system 600 may be formed using two chips 610, 612, metal stack structures, interposers, or the like. The chips 610, 612 may be similar to, or formed similarly to, the 2D ion shuttling structure. The chips 610, 612 are spaced apart by a spacer layer 616 that forms a shuttling tunnel 602. In some embodiments, the spacer layer 616 is part of the first chip 610 or second chip, and has a groove or other opening so that, when the first and second chips are bonded, the groove in the spacer layer 616 forms the shuttling tunnel 602.

In the 3D ion shuttling system 600, the chips 610, 612 may have a metal stack with a plurality of substrate 614, 618, such as insulator layers with metal features formed therein. In some embodiments, a first chip 610 and a second chip 612 each may have an RF electrode 404, compensation electrodes 21A, 218B (optionally), and electrode groups 210 in one of the substrates 614, insulating layers or metallization layers. The electrode groups 210 and (optionally) compensation electrodes 218A, 218B may act as RF ground electrodes for the RF electrodes 404. Thus, both the first chip 610 and the second chip 612 may have circuitry and features for providing the RF field, shuttling voltages and compensation fields, with an RF electrode 404 opposite a space for the shuttling tunnel 602 from the respective electrode groups 210 and (optional) compensation electrodes 518A, 518B on the same chip 610, 612. In some embodiments, the RF-field generated may hold the ion 402 at the first distance D1 from the plurality of substrate 614, 618. In some embodiments, the layout of the electrodes in the first and second chip may be substantially the same, so that, when a first chip 610 is mounted on a second chip 612, the electrode arrangements are mirror images, with a first RF electrode 404 in the first chip 610 opposite the shuttling tunnel 602 from a second RF electrode 605 in the second chip. Similarly, the second compensation electrode 518B and electrode groups 210 in the first chip 610 may be opposite the shuttling tunnel 602 from the first compensation electrode 518A and electrode groups 210 of the second chip 612.

The E-field profile illustrates two E-fields 620, 624, with a first E-field 620. In one embodiment the E-field 620 generated is a result of applying a first compensation voltage to a first compensation electrode 218A. A second, smaller E-field 624 is generated as a result of applying a second compensation voltage smaller than the first compensation voltage. The overlapping E-fields 620, 624 form a compensation trapping point 626. The ion 402 tends to shift along the compensation direction to reach the compensation trapping point 626, and thus, adjusting the difference between the first and second compensation voltages change the relationship of the first and second E-field 620, 624, moving the compensation trapping point 626 and shifting the ion position. Notably, the RF field keeps the ion 402 positioned vertically in the shuttling tunnel 602 and between the chips 610, while the compensation voltage applied to the compensation electrodes 218A, 218B generates the component compensation fields in the component compensation directions 410A, 410B resulting in a shift of the ion position in a plane of the compensation direction 408 substantially perpendicular to the movement direction 620. In another embodiment, the same effect may be achieved by creating a voltage differential between electrode groups 210 on opposite sides of the shuttling tunnel 602. In this embodiment, the voltage differential between electrode groups 210 on opposite sides of the shuttling tunnel 602 may be achieved by switching the voltage set on individual electrode elements 362 within an electrode group 210 on one side of the shuttling tunnel 602 without switching the corresponding electrode element 362 within the corresponding electrode group 210 on the other side of the shuttling tunnel 602.

In some embodiments, the ion 402 may have its vertical position within the shuttling tunnel 602 adjusted while the ion is shuttled through a junction. In these embodiments, the vertical position of the ion 402 within the shuttling tunnel 602 may be controlled by adjusting the voltage applied to the RF electrodes 404 (thereby adjusting the RF-trapping point), the voltage applied to compensation electrodes 218A, 218B (thereby adjusting the DC-trapping point), or by adjusting the voltage profile of the electrode group 210 (thereby adjusting the DC-trapping point) through controlled switching of the voltages applied to the electrode elements 362 within the electrode group 210, or through a combination of these adjustments. Controlling the vertical position of the ion 402 in the shuttling tunnel 602 while the ion 402 is being shuttled through the junction allows for fine control of height of the ion 402, which can be required or beneficial for ion transport through a junction. In accordance with some embodiments, raising the voltages applied to the RF electrodes 404 or the compensation electrodes 218A, 218B (or both) may relatively raise the vertical position of the ion 402 in the shuttling tunnel 602 and lowering the voltages applied to the RF electrodes 404 or the compensation electrodes 218A, 218B (or both) may relatively lower the vertical position of the ion 402 in the shuttling tunnel 602. Similarly, increasing the number of electrode elements 362 receiving the high voltage VH 360 and decreasing the number of electrode elements 362 receiving the low voltage VL 358 may raise the vertical position of the ion 402 in the shuttling tunnel 602. Conversely, decreasing the number of electrode elements 362 receiving the high voltage VH 360 and increasing the number of electrode elements 362 receiving the low voltage VL 358 may relatively lower the vertical position of the ion 402 in the shuttling tunnel 602. In accordance with some embodiments, the positioning of the RF electrodes 404, the compensation electrodes 218A, 218B, and the electrode elements 362 relative to the shuttling tunnel 602 determines the relative position in which adjusting the voltages or voltage profiles may raise or lower the ion 402 in the relative vertical position. Further, while the discussion of adjusting the vertical position of the ion 402 while shuttling the ion 402 across a junction has been with respect to a 3D ion shuttling system, this embodiment is merely illustrative and may be similarly applied to the shuttling of the ion 402 across a junction in a 2D ion shuttling system.

FIG. 6B is an isometric view illustrating a 3D ion shuttling system with compensation electrodes 218A, 218B according to some embodiments. FIG. 6C is a top view illustrating a 3D ion shuttling system with compensation electrodes 218A, 218B according to some embodiments. Similar to the 2D system, the RF field provided by the RF electrodes 404 traps the ion 402, and switching the voltages applied to individual electrode elements 362 shifts the voltage profiles of the electrode groups 210 causing the ion 402 to move along the movement direction 620. Applying compensation voltages to the compensation electrodes 218A, 218B and individual electrode elements 362 of a specified electrode group 210 may shift the ion along a plane of the compensation direction 408.

Figure 6D:
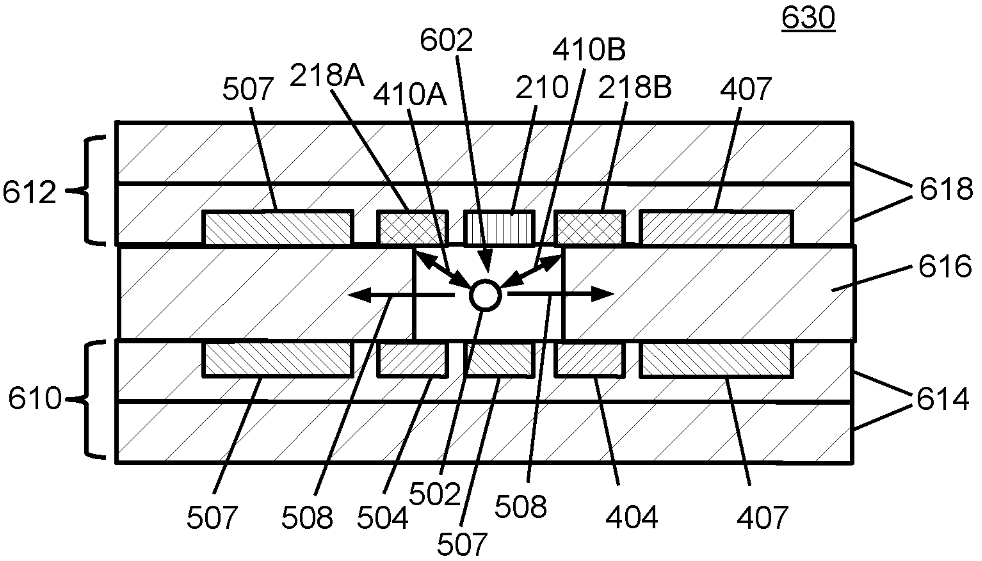
Figure 6E:
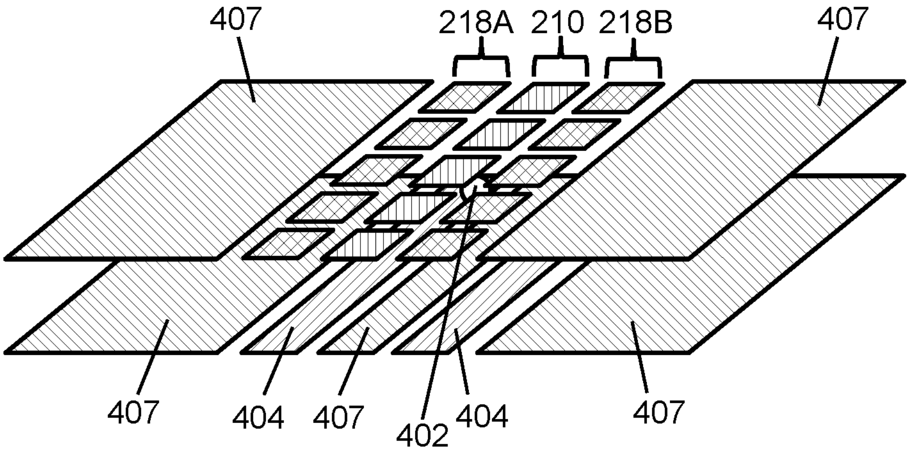

FIGS. 6D-6E are diagrams illustrating a 3D ion shuttling system 630 with (optional) compensation electrodes 218A, 218B according to some embodiments. FIG. 6D is a diagram illustrating a cutaway or side view of the 3D ion shuttling system 630 with compensation electrodes 218A, 218B and inner electrode groups 210 according to some embodiments, and FIG. 6E is an isometric view of the 3D ion shuttling system 630 with compensation electrodes 218A, 218B and inner electrode groups 210 according to some embodiments.

In some embodiments, the 3D system 630 is formed from first and second chips 610, 612, which each have a metal stack with a substrate 614, 618 or insulator layer with metal features formed therein. In some embodiments, a first chip 610 has RF electrodes 404 and first RF ground electrode 407 between the RF electrode 404 in one of the substrates 614, insulating layers or metallization layers. Second RF ground electrodes 407 may be disposed outside of the RF electrodes 404 in the first chip 610. A second chip 612 may have electrode groups 210 between first compensation electrodes 218A and second compensation electrodes 218B. The electrode groups 210 and compensation electrodes 218A, 218B may be between third RF ground electrodes 407 that are also disposed in the second chip 612. Thus, the first chip 610 may primarily have circuitry and features of the RF electrodes 404 and RF ground electrodes 407 for providing the RF field, and the second chip 612 may have circuitry and features for providing the shuttling and compensation.

The compensation voltage may be applied to the compensation electrodes 218A, 218B and individual electrode elements 362 from an electrode group 210 to generate the component compensation fields in the component compensation directions 410A, 410B resulting in a shift of the ion 402 position in a plane of the compensation direction 408 substantially perpendicular to the movement direction 620. This permits adjustment of the ion 402 positioning while the RF field keeps the ion 402 positioned vertically in the shuttling tunnel 602 and between the chips 610, 612.

Further, the embodiments discussed with respect to FIGS. 6A-6E are fully intended to incorporate the increment switching of the voltages applied to the electrode elements 362 defining the voltage profiles of the electrode groups 210 as discussed above with respect to FIGS. 4A-4D.

Figure 7:
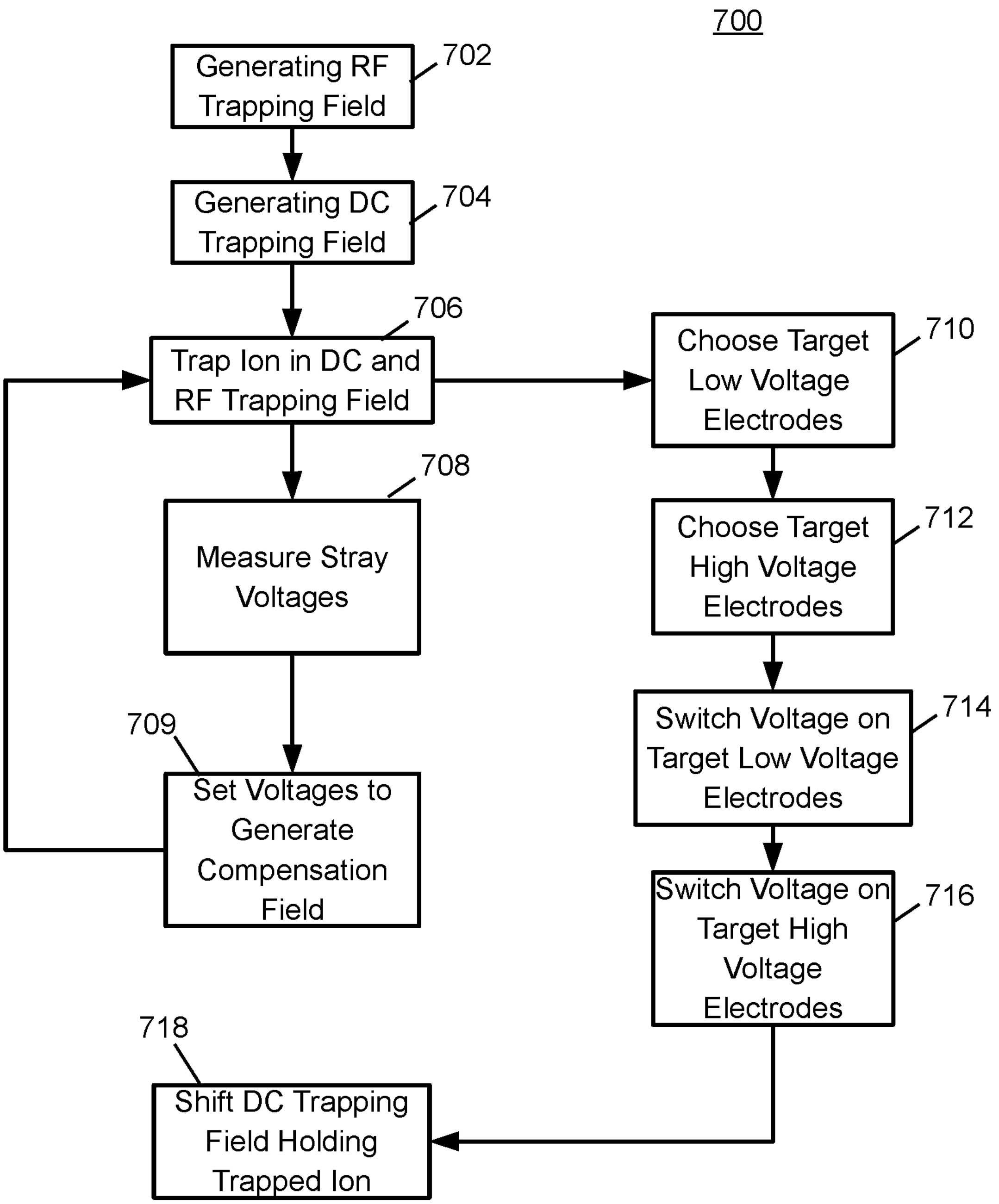
FIG. 7 is a flow diagram illustrating a method for an ion movement system involving shifting along a shuttling lane a confinement field defined by voltage profiles on the electrodes by switching voltages set on the movement electrodes within the electrodes according to some embodiments.

FIG. 7 is a flow diagram illustrating a method 700. The method 700 may comprise two parts (e.g., steps 702 to 709, and 710 to 718, which can be performed subsequently or independent from each other). The steps 702 to 709 relate to measuring stray voltages and setting voltages on electrodes (such as compensation electrodes 218) to generate compensation fields. The steps 710 to 716 relate to shuttling an ion along the shuttling lanes within the ion trap areas by shifting the confinement field holding the trapped ion within the associated with the low voltage profile associated with an electrode group (such as a first electrode group 210A as discussed above, e.g., with regard to FIGS. 4D to 4F) abutted by electrode groups (such as a second electrode group 210B as discussed above, e.g., with regard to FIGS. 4D to 4F) with the high voltage profile providing the E-field. Shifting the confinement field holding the trapped ion may be achieved by switching the voltages set on individual electrodes and by maintaining the voltages on the compensation electrodes, thereby modifying the voltage profiles producing the E-field and corresponding confinement field.

In block 702, the RF electrodes and RF ground electrodes may generate an RF trapping point for holding the ion at a distance (e.g., the first distance D1) from an associated substrate containing the RF electrode elements. In some embodiments, the RF electrodes elements may be turned on by applying a voltage to the RF electrode elements configured for the ion trap areas.

In block 704, DC trapping fields are generated by applying voltages to the electrodes, with the voltages being associated with electrode groups, so that the electrodes are either high or low voltage electrodes, resulting in an electrode group with a low voltage profile or high voltage electrode elements with an electrode group having a high voltage profile. The voltage profiles is associated with the electrode groups providing an E-field with a DC trapping point that holds the ion. In some embodiments, the voltages applied to the electrodes are DC voltages as precomputed in a simulation. Steps 702 and 704 may be performed to generate a confinement potential for trapping the ions at the trapping point. These two steps may be omitted in a method for generating compensation fields (which may be considered to start after steps 702 and 704 are performed). In such an embodiment, steps 706, 708 and 709 may be performed independently.

In block 706, the ion is trapped in the ion trap areas and held at a location along the shuttling lane defined according to the RF trapping point established in block 702 and the DC trapping point established in block 704.

In block 708, stray fields may be measured and re-measured. In some embodiments the measurement of the stray fields may be a stray field compensation measurement. In an embodiment, the stray field compensation measurement may be performed at each ion position for the whole trap to determine the stray field values for the trap areas as a whole. In other words, for each ion position a separate stray field compensation measurement may be performed to determine a stray field at each of the ion positions. Once the stray field values are measured, compensated voltages for shuttling can be precompiled. For example, some of the compensation electrodes 218 may be identified and corresponding voltages to be applied to the identified compensation electrodes 218 may be selected (such as +20V, +10V, 0V, −10V, −20V, for example). In one example, there could be a non-zero voltage to a subset of compensation electrodes and zero voltage to all remaining compensation electrodes. These voltages are to be applied to the identified compensation electrodes in order to generate an electric counter-field that compensates for the electric field that is caused by stray fields, such as those discussed below with respect to block 709.

In block 709, the E-field may be adjusted to align the DC trapping point with the RF trapping point by setting a voltage on a compensation electrode to generate a compensation field. The compensation field may be generated by switching the voltage set on an individual electrode element or segment (e.g., the compensation electrode) within an electrode group, or by setting a voltage on a separate compensation electrode. These voltages for stray field compensation may remain on the respective electrodes (e.g., compensation electrodes 218) for a time period that is substantially larger than the time period for shuttling an ion from one electrode segment to the next. The voltages on the compensation electrodes 218 may be updated to maintain the compensation electrodes 218 only occasionally (e.g., substantially less frequently than voltages are switched during shuttling of an ion). In an embodiment, the voltages may be adjusted according to the stray field compensation measurement.

Steps 710 to 716 may be performed after the stray field compensation (steps 706 to 709, as discussed above) and relate to shuttling an ion. As discussed above, the voltages for stray field compensation may remain unaltered during the shuttling.

In block 710, one or more low voltage electrodes within an electrode group 210 having a low voltage profile from having a low voltage applied to the one or more low voltage electrodes within the electrode group, adjacent to individual or pairs of high voltage electrode elements, within an electrode group having a high voltage profile, are identified. For example, the one or more low voltage electrodes may be identified based on the low voltage electrodes distance to the ion that is to be shuttled and a particular shuttling sequence (e.g., as shown in FIGS. 4D to 4F). In an embodiment, the one or more low voltage electrodes are chosen by values of the DACs and the digital control.

In block 712 one or more high voltage electrodes, within an electrode group having a high voltage profile from having a high voltage applied to the one or more high voltage electrodes within the electrode group, adjacent to individual or pairs of low voltage electrode, within an electrode group having a low voltage profile opposite the individual or pairs of low voltage electrodes identified in block 710, are identified. For example, the one or more high voltage electrodes may be identified based on the high voltage electrodes distance to the ion that is to be shuttled and a particular shuttling sequence (e.g., as shown in FIGS. 4D to 4F). In an embodiment, the one or more high voltage electrodes are chosen by values of the DACs and the digital control.

In block 714 the low voltage electrodes identified in block 710 are switched from being set with the low voltage VL to being set with the high voltage VH.

In block 716 the individual or pairs of high voltage electrode elements identified in block 712 are switched from being set to the high voltage VH to being set to the low voltage VL.

In block 718, the switching of the voltages set on electrode chosen in blocks 710 and 712 shifts the DC trapping field along the shuttling lane, and the generation of the compensation field shifts the DC trapping point to align with the RF trapping point, thereby controlling the location of the ion in the ion trap area by shifting the location of the DC trapping field within the ion trap area. In an embodiment, the values of the DACs and the digital control are coordinated for the switching of the voltages.

In accordance with some embodiments of the present disclosure, a system includes at least one radio frequency (RF) electrode extending along a first direction, the at least one RF electrode configured to generate an RF field, where a first RF electrode of the least one RF electrode is disposed in a substrate, and a plurality of direct current (DC) electrodes that are spaced apart along at least the first direction, the plurality of DC electrodes configured to generate an electric field, where the RF field and the electric field are configured to trap an ion at a first position, the first position being spaced apart from the substrate by a first distance, where each DC electrode of the plurality of DC electrodes has a respective width in the first direction that is less or equal to 0.2 times the first distance.

In an embodiment, a voltage control system connected to each DC electrode of the plurality of DC electrodes, where the voltage control system is configured to form a plurality of first electrode groups from the plurality of DC electrodes by selectively connecting a first voltage to each DC electrode within the plurality of first electrode groups and where the voltage control system is configured to form a plurality of second electrode groups from the plurality of DC electrodes by selectively connecting a second voltage to each DC electrode within the plurality of second electrode groups, where the first voltage is different from the second voltage, where each DC electrode within each one of the plurality of first electrode groups is directly adjacent to another DC electrode within that one of the plurality of first electrode groups, where each DC electrode within each one of the plurality of second electrode groups is directly adjacent to another DC electrode within that one of the plurality of second electrode groups, where at least one DC electrode within each one of the plurality of first electrode groups is directly adjacent to at least one DC electrode within each one of the plurality of second electrode groups, and where the first position is disposed within a plane aligning with a first electrode group of the plurality of first electrode groups. In an embodiment, the voltage control system is configured to move the first position along the first direction by selectively switching a first DC electrode from a first electrode group of the plurality of first electrode groups from being connected to the first voltage to being connected to the second voltage and to being part of a second electrode group of the plurality of second electrode groups, and configured to selectively switch a second DC electrode from a third electrode group of the plurality of second electrode groups from being connected to the second voltage to being connected to the first voltage and to being part of the first electrode group, where the first electrode group is disposed between the second electrode group and the third electrode group, where the selectively switching the first DC electrode from being connected to the first voltage to being connected to the second voltage and selectively switching the second DC electrode from being connected to the second voltage to being connected to the first voltage is configured to shift the plane aligning with the first electrode group along the first direction. In an embodiment, the voltage control system is configured to move the first position along a second direction within the plane aligning with a first electrode group of the plurality of first electrode groups by selectively switching a third DC electrode within the first electrode group from being connected to the first voltage to being connected to the second voltage, where the second direction is different from the first direction. In an embodiment, the plurality of first electrode groups each includes at least three DC electrodes that are spaced apart along a second direction that is different from the first direction, where each DC electrode of the at least three DC electrodes is directly adjacent to at least another one of the at least three DC electrodes along the second direction. In an embodiment, a first electrode group of the plurality of first electrode groups includes at least twenty DC electrodes from the plurality of DC electrodes. In an embodiment, a first electrode group of the plurality of first electrode groups has a collective width, in the first direction, that is less than or equal to 1 times the first distance. In an embodiment, the plurality of direct current (DC) electrodes includes compensation electrodes configured to shift the first position along a second direction perpendicular to the first direction and shuttling electrodes configured to shift the first position along the first direction. In an embodiment, a compensation controller, where the compensation controller is configured to apply a compensation voltage to one or more of the plurality of DC electrodes that are spaced apart along at least the first direction.

In accordance with some embodiments of the present disclosure, a system includes at least one radio frequency (RF) electrode extending along a first direction, the at least one RF electrode configured to generate an RF field, where a first RF electrode of the at least one RF electrode is disposed in a substrate, and a plurality of direct current (DC) electrodes that are spaced apart along at least the first direction, where at least three DC electrodes from the plurality of DC electrodes are spaced apart along a second direction that is different from the first direction, where each DC electrode of the at least three DC electrodes is directly adjacent to at least another one of the at least three DC electrodes along the second direction, the at least three DC electrodes configured to generate an electric field, where the RF field and the electric field are configured to trap an ion at a first position, the first position being spaced apart from the substrate by a first distance in a third direction, the third direction being different from the first direction and the second direction.

In an embodiment, the plurality of DC electrodes that are spaced along the at least the first direction includes the at least three DC electrodes that are spaced apart along the second direction as the plurality of DC electrodes extends across a width of the first RF electrode in the first direction. In an embodiment, a first electrode group of the plurality of first electrode groups includes at least twenty DC electrodes from the plurality of DC electrodes. In an embodiment, each DC electrode of the plurality of DC electrodes has a respective width in the first direction that is less or equal to 0.1 times the first distance. In an embodiment, a first DC electrode of the at least three DC electrodes has a first width in the second direction and a second DC electrode of the at least three DC electrodes has a second width different from the first width in the second direction.

In accordance with some embodiments of the present disclosure, a system includes at least one radio frequency (RF) electrode extending along a first direction, the at least one RF electrode configured to generate an RF field, where a first RF electrode of the at least one RF electrode is disposed in a substrate, and a plurality of direct current (DC) electrodes that are spaced apart along at least the first direction, where at least twenty DC electrodes of the plurality of DC electrodes are configured to generate an electric field, where the RF field generated by the at least one RF electrode and the electric field generated by the at least twenty DC electrodes are configured to trap a single ion or a single chain of ions at a first position, the first position being spaced apart from the substrate by a first distance.

In an embodiment, a shuttling control system connected to each DC electrode of the plurality of DC electrodes, where the shuttling control system is configured to form a plurality of first lane groups from the plurality of DC electrodes by providing a first voltage to each DC electrode within the plurality of first lane groups and where the shuttling control system is configured to form a plurality of second lane groups from the plurality of DC electrodes by providing a second voltage to each DC electrode within the plurality of second lane groups, where the first voltage is different from the second voltage, where each of the plurality of first lane groups and the plurality of second lane groups each includes the at least twenty DC electrodes, where each DC electrode within each one of the plurality of first lane groups is directly adjacent to another DC electrode within that one of the plurality of first lane groups, where each DC electrode within each one of the plurality of second lane groups is directly adjacent to another DC electrode within that one of the plurality of second lane groups, where at least one DC electrode within each one of the plurality of first lane groups is directly adjacent to at least one DC electrode within each one of the plurality of second lane groups, and where the first position is disposed within a plane corresponding to a first lane group of the plurality of first lane groups. In an embodiment, the shuttling control system is configured to move the first position along the first direction by systematically switching a first DC electrode from a first lane group of the plurality of lane groups from being provided with the first voltage to being provided with the second voltage and to being part of a second lane group of the plurality of second lane groups, and configured to systematically switch a second DC electrode from a third lane group of the plurality of second lane groups from being provided with the second voltage to being provided with the first voltage and to being part of the first lane group, where the first lane group is disposed between the second lane group and the third lane group, where the systematically switching the first DC electrode from being provided with the first voltage to being provided with the second voltage and systematically switching the second DC electrode from being provided with the second voltage to being provided with the first voltage is configured to shift the plane corresponding to the first lane group along the first direction. In an embodiment, a compensation control system configured to move the first position along a second direction within the plane corresponding to a first lane group of the plurality of lane groups by altering the electric field by providing a third voltage to a pair of compensation electrodes, where the second direction is different from the first direction and the pair of compensation electrodes are bisected by the first lane group. In an embodiment, each first lane group of the plurality of first lane groups includes at least three DC electrodes that are spaced apart along a second direction that is different from the first direction, where each DC electrode of the at least three DC electrodes is directly adjacent to at least another one of the at least three DC electrodes along the second direction. In an embodiment, the at least twenty DC electrodes of the plurality of DC electrodes includes at least thirty DC electrodes. In an embodiment, the at least twenty DC electrode of the plurality of DC electrodes includes at least forty DC electrodes.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system comprising:

at least one radio frequency (RF) electrode extending along a first direction, the at least one RF electrode configured to generate an RF field, wherein a first RF electrode of the least one RF electrode is disposed in or on a substrate; and a plurality of direct current (DC) electrodes that are spaced apart along at least the first direction, the plurality of DC electrodes configured to generate an electric field, wherein the RF field and the electric field are configured to trap an ion at a first position, the first position being spaced apart from the substrate by a first distance, wherein each DC electrode of the plurality of DC electrodes has a respective width in the first direction that is less than or equal to 0.2 times the first distance.

2. The system of claim 1, further comprising a voltage control system connected to each DC electrode of the plurality of DC electrodes, wherein the voltage control system is configured to form a plurality of first electrode groups from the plurality of DC electrodes by selectively connecting a first voltage to each DC electrode within the plurality of first electrode groups and wherein the voltage control system is configured to form a plurality of second electrode groups from the plurality of DC electrodes by selectively connecting a second voltage to each DC electrode within the plurality of second electrode groups, wherein the first voltage is different from the second voltage, wherein each DC electrode within each one of the plurality of first electrode groups is directly adjacent to another DC electrode within that one of the plurality of first electrode groups, wherein each DC electrode within each one of the plurality of second electrode groups is directly adjacent to another DC electrode within that one of the plurality of second electrode groups, wherein at least one DC electrode within each one of the plurality of first electrode groups is directly adjacent to at least one DC electrode within each one of the plurality of second electrode groups, and wherein the first position is disposed within a plane aligning with a first electrode group of the plurality of first electrode groups.

3. The system of claim 2, wherein the voltage control system is further configured to move the first position along the first direction by selectively switching a first DC electrode from a first electrode group of the plurality of first electrode groups from being connected to the first voltage to being connected to the second voltage and to being part of a second electrode group of the plurality of second electrode groups, and further being configured to selectively switch a second DC electrode from a third electrode group of the plurality of second electrode groups from being connected to the second voltage to being connected to the first voltage and to being part of the first electrode group, wherein the first electrode group is disposed between the second electrode group and the third electrode group, wherein the selectively switching the first DC electrode from being connected to the first voltage to being connected to the second voltage and selectively switching the second DC electrode from being connected to the second voltage to being connected to the first voltage is configured to shift the plane aligning with the first electrode group along the first direction.

4. The system of claim 2, wherein the voltage control system is further configured to move the first position along a second direction within the plane aligning with a first electrode group of the plurality of first electrode groups by selectively switching a third DC electrode within the first electrode group from being connected to the first voltage to being connected to the second voltage, wherein the second direction is different from the first direction.

5. The system of claim 2, wherein the plurality of first electrode groups each comprise at least three DC electrodes that are spaced apart along a second direction that is different from the first direction, wherein each DC electrode of the at least three DC electrodes is directly adjacent to at least another one of the at least three DC electrodes along the second direction.

6. The system of claim 2, wherein a first electrode group of the plurality of first electrode groups comprises at least twenty DC electrodes from the plurality of DC electrodes.

7. The system of claim 2, wherein a first electrode group of the plurality of first electrode groups has a collective width, in the first direction, that is less than or equal to 1 times the first distance.

8. The system of claim 1, wherein the plurality of direct current (DC) electrodes comprises compensation electrodes configured to shift the first position along a second direction perpendicular to the first direction and shuttling electrodes configured to shift the first position along the first direction.

9. The system of claim 1, further comprising a compensation controller, wherein the compensation controller is configured to apply a compensation voltage to one or more of the plurality of DC electrodes that are spaced apart along at least the first direction.

10. A system comprising:

at least one radio frequency (RF) electrode extending along a first direction, the at least one RF electrode configured to generate an RF field, wherein a first RF electrode of the at least one RF electrode is disposed in or on a substrate; and a plurality of direct current (DC) electrodes that are spaced apart along at least the first direction, wherein at least three DC electrodes from the plurality of DC electrodes are spaced apart along a second direction that is different from the first direction, wherein each DC electrode of the at least three DC electrodes is directly adjacent to at least another one of the at least three DC electrodes along the second direction, the at least three DC electrodes configured to generate an electric field, wherein the RF field and the electric field are configured to trap an ion at a first position, the first position being spaced apart from the substrate by a first distance in a third direction, the third direction being different from the first direction and the second direction.

11. The system of claim 10, wherein the plurality of DC electrodes that are spaced along the at least the first direction comprise the at least three DC electrodes that are spaced apart along the second direction as the plurality of DC electrodes extends across a width of the first RF electrode in the first direction.

12. The system of claim 10, wherein a first electrode group comprises at least twenty DC electrodes from the plurality of DC electrodes.

13. The system of claim 10, wherein each DC electrode of the plurality of DC electrodes has a respective width in the first direction that is less than or equal to 0.1 times the first distance.

14. The system of claim 10, wherein a first DC electrode of the at least three DC electrodes has a first width in the second direction and a second DC electrode of the at least three DC electrodes has a second width different from the first width in the second direction.

15. A system comprising:

at least one radio frequency (RF) electrode extending along a first direction, the at least one RF electrode configured to generate an RF field, wherein a first RF electrode of the at least one RF electrode is disposed in or on a substrate; and a plurality of direct current (DC) electrodes that are spaced apart along at least the first direction, wherein at least twenty DC electrodes of the plurality of DC electrodes are configured to generate an electric field, wherein the RF field generated by the at least one RF electrode and the electric field generated by the at least twenty DC electrodes are configured to trap a single ion or a single chain of ions at a first position, the first position being spaced apart from the substrate by a first distance.

16. The system of claim 15, further comprising a shuttling control system connected to each DC electrode of the plurality of DC electrodes, wherein the shuttling control system is configured to form a plurality of first lane groups from the plurality of DC electrodes by providing a first voltage to each DC electrode within the plurality of first lane groups and wherein the shuttling control system is configured to form a plurality of second lane groups from the plurality of DC electrodes by providing a second voltage to each DC electrode within the plurality of second lane groups, wherein the first voltage is different from the second voltage, wherein each of the plurality of first lane groups and the plurality of second lane groups each comprise the at least twenty DC electrodes, wherein each DC electrode within each one of the plurality of first lane groups is directly adjacent to another DC electrode within that one of the plurality of first lane groups, wherein each DC electrode within each one of the plurality of second lane groups is directly adjacent to another DC electrode within that one of the plurality of second lane groups, wherein at least one DC electrode within each one of the plurality of first lane groups is directly adjacent to at least one DC electrode within each one of the plurality of second lane groups, and wherein the first position is disposed within a plane corresponding to a first lane group of the plurality of first lane groups.

17. The system of claim 16, wherein the shuttling control system is further configured to move the first position along the first direction by systematically switching a first DC electrode from a first lane group of the plurality of first lane groups from being provided with the first voltage to being provided with the second voltage and to being part of a second lane group of the plurality of second lane groups, and further being configured to systematically switch a second DC electrode from a third lane group of the plurality of second lane groups from being provided with the second voltage to being provided with the first voltage and to being part of the first lane group, wherein the first lane group is disposed between the second lane group and the third lane group, wherein the systematically switching the first DC electrode from being provided with the first voltage to being provided with the second voltage and systematically switching the second DC electrode from being provided with the second voltage to being provided with the first voltage is configured to shift the plane corresponding to the first lane group along the first direction.

18. The system of claim 16, further comprising a compensation control system configured to move the first position along a second direction within the plane corresponding to a first lane group of the plurality of first lane groups by altering the electric field by providing a third voltage to a pair of compensation electrodes, wherein the second direction is different from the first direction and the pair of compensation electrodes is bisected by the first lane group.

19. The system of claim 16, wherein each first lane group of the plurality of first lane groups comprises at least three DC electrodes that are spaced apart along a second direction that is different from the first direction, wherein each DC electrode of the at least three DC electrodes is directly adjacent to at least another one of the at least three DC electrodes along the second direction.

20. The system of claim 15, wherein the at least twenty DC electrodes of the plurality of DC electrodes comprise at least thirty DC electrodes.

21. The system of claim 15, wherein the at least twenty DC electrode of the plurality of DC electrodes comprise at least forty DC electrodes.

* * * * *